United States Patent
Mukkamala et al.

(10) Patent No.: US 9,336,023 B2
(45) Date of Patent: May 10, 2016

(54) VISUAL GENERATION OF MOBILE APPLICATIONS BASED ON DATA MODELS

(75) Inventors: Himagiri Mukkamala, Pleasanton, CA (US); Cliff Collins, Dublin, CA (US); Stella Yu, San Ramon, CA (US)

(73) Assignee: SYBASE, INC., Dublin, CA (US)

( * ) Notice: Subject to any disclaimer, the term of this patent is extended or adjusted under 35 U.S.C. 154(b) by 1237 days.

(21) Appl. No.: 12/642,129

(22) Filed: Dec. 18, 2009

(65) Prior Publication Data

US 2011/0154287 A1 Jun. 23, 2011

(51) Int. Cl.
*G06F 9/44* (2006.01)
*G06F 9/445* (2006.01)

(52) U.S. Cl.
CPC .............. *G06F 9/44542* (2013.01); *G06F 8/20* (2013.01); *G06F 8/30* (2013.01); *G06F 8/35* (2013.01); *G06F 8/76* (2013.01); *G06F 9/445* (2013.01); *G06F 9/44536* (2013.01)

(58) Field of Classification Search
None
See application file for complete search history.

(56) References Cited

U.S. PATENT DOCUMENTS

| | | | | |
|---|---|---|---|---|
| 5,355,494 | A * | 10/1994 | Sistare et al. ................. | 717/154 |
| 6,964,029 | B2 * | 11/2005 | Poznanovic et al. .......... | 716/105 |
| 7,151,438 | B1 * | 12/2006 | Hall et al. ................. | 340/286.06 |
| 8,204,870 | B2 | 6/2012 | Mukkamala et al. | |
| 8,261,231 | B1 * | 9/2012 | Hirsch ...................... | G06F 8/20 709/201 |
| 8,392,498 | B2 * | 3/2013 | Berg ..................... | H04J 3/0667 709/202 |
| 8,832,644 | B2 * | 9/2014 | Hirsch ...................... | G06F 8/20 717/107 |
| 8,875,095 | B2 * | 10/2014 | Hirsch ...................... | G06F 8/20 717/107 |
| 8,898,629 | B2 * | 11/2014 | Hirsch ...................... | G06F 8/20 717/107 |
| 8,978,006 | B2 * | 3/2015 | Hirsch ...................... | G06F 8/71 717/107 |
| 8,997,038 | B2 * | 3/2015 | Bozek ..................... | H04L 67/10 717/106 |
| 9,015,657 | B2 * | 4/2015 | Akins ....................... | G06F 8/36 717/106 |
| 9,043,750 | B2 * | 5/2015 | Hoffmann ................ | G06F 8/30 717/106 |
| 9,134,964 | B2 * | 9/2015 | Hirsch ...................... | G06F 8/30 |
| 2002/0069192 | A1 * | 6/2002 | Aegerter ......................... | 707/1 |
| 2003/0208743 | A1 * | 11/2003 | Chong et al. ................. | 717/106 |
| 2004/0172637 | A1 * | 9/2004 | Koutyrine .................... | 719/328 |
| 2004/0205772 | A1 * | 10/2004 | Uszok et al. ................. | 719/317 |
| 2005/0114355 | A1 * | 5/2005 | Nuttila ......................... | 707/100 |
| 2006/0047665 | A1 * | 3/2006 | Neil ............................... | 707/10 |
| 2006/0190806 | A1 * | 8/2006 | Sasson et al. ................ | 715/500 |

(Continued)

OTHER PUBLICATIONS

'PhoneGap Simplifies iPhone, Android, BlackBerry Development' by Darryl K. Taft, Posted Mar. 13, 2009.*

(Continued)

*Primary Examiner* — Steven Snyder
(74) *Attorney, Agent, or Firm* — Sterne, Kessler, Goldstein & Fox P.L.L.C.

(57) ABSTRACT

Systems, methods and computer program products for mobile device application design are described herein. The method accesses a data model corresponding to a selected mobile platform. The data model is used by a device application designer to generate, model, and debug a mobile application. The data model is used to take into consideration characteristics of the selected platform and a selected mobile device as the application is designed. The application is structured and generated for a selected platform that is independent of the data model, but is cognizant of the selected platform. A simulator models the application user interface (UI) as it will appear on the selected platform. The method performs platform-specific validation and allows for correction of various aspects of a generated application including platform-specific features. The tool generates a graphical image that can guide a developer to either generated code or help files corresponding to framework libraries.

16 Claims, 20 Drawing Sheets

(56) References Cited

U.S. PATENT DOCUMENTS

| | | | |
|---|---|---|---|
| 2007/0043531 A1* | 2/2007 | Kosche et al. | 702/182 |
| 2007/0300237 A1* | 12/2007 | Neil et al. | 719/319 |
| 2008/0127233 A1* | 5/2008 | Neil et al. | 719/330 |
| 2008/0189328 A1* | 8/2008 | Sareday et al. | 707/104.1 |
| 2008/0201453 A1* | 8/2008 | Assenmacher | 709/219 |
| 2010/0030783 A1 | 2/2010 | Ho et al. | |
| 2010/0325608 A1* | 12/2010 | Radigan | 717/106 |
| 2012/0260232 A1* | 10/2012 | Hirsch | G06F 8/20 717/107 |
| 2013/0055199 A1* | 2/2013 | Kryukov | G06F 8/34 717/107 |
| 2013/0139148 A1* | 5/2013 | Berg | H04J 3/0667 717/177 |
| 2013/0205276 A1* | 8/2013 | Hirsch | G06F 8/20 717/105 |
| 2013/0205278 A1* | 8/2013 | Hirsch | G06F 8/20 715/121 |
| 2014/0173454 A1* | 6/2014 | Sanchez | G06F 8/20 715/747 |
| 2014/0317596 A1* | 10/2014 | Bouris | G06F 9/44536 717/106 |
| 2015/0268936 A1* | 9/2015 | Huber | G06F 8/30 717/108 |
| 2016/0004515 A1* | 1/2016 | Baeck | G06F 8/20 717/109 |

OTHER PUBLICATIONS

'Cross-Platform Mobile App Software Development in the Curriculum' by Kyle Lutes, Issues in Informing Science and Information Technology vol. 9, 2012.*

\* cited by examiner

VISUAL GENERATION OF MOBILE APPLICATIONS BASED ON DATA MODELS

FIELD OF THE INVENTION

The present invention is generally related to mobile applications, and more specifically to tools for developing applications for mobile platforms.

BACKGROUND OF THE INVENTION

Mobile devices with the ability to run software applications continue to become prevalent in the field. Due to differences between mobile device hardware and operating systems, many mobile applications must be tailored to and customized for specific types of mobile devices. Thus, multiple versions of mobile applications must be developed to run on disparate mobile operating platforms, operating systems, and mobile devices. Mobile applications must be designed and developed in light of mobile device hardware capabilities, enterprise software, wireless network capabilities, and the target mobile device platform. Mobile application development represents a rapidly growing business segment.

Due to the broad range of mobile device capabilities and characteristics, mobile application development often entails designing, developing, and debugging software code using platform-specific development environments and tools for each specific device type. There are many flaws with this approach. For example, using this approach, it is difficult, if not impossible, to readily visualize and debug applications to ensure consistency of mobile applications across different mobile device platforms. As a result, it is difficult to efficiently test and debug mobile applications to be deployed to multiple mobile platforms.

This approach also does not afford efficient platform-neutral code generation. As a result, mobile application development costs increase and software releases are delayed.

Accordingly, what is needed is an improved platform-neutral approach for developing and debugging mobile applications for a multiple platforms.

BRIEF SUMMARY OF THE INVENTION

The present invention is directed to systems, methods and computer program products for developing device applications. A device application is a software application that runs on a mobile device. Briefly stated, according to an embodiment, a developer can create device applications using a device application designer tool. In an alternative embodiment, a developer can use an application programming interface (API) framework to develop device applications. In an embodiment, a data model corresponding to a selected mobile platform and device is accessed to enable visual device application design so that device application code corresponding to a selected platform and device is generated. In an embodiment, the device application designer tool is accessed via an interactive user interface in order to simulate or model the operation of generated device applications for testing and debugging purposes.

The systems, methods, and computer program products are used to develop mobile applications for a plurality of diverse mobile devices running a plurality of operating systems. In an embodiment, the device application designer tool takes into consideration characteristics of the diverse mobile devices and platforms and generates applications for a plurality of device types independent of the data model but cognizant of the device and appropriately structuring the application. The mobile applications that are built using the data model are provisioned on to the devices in a secure way across various devices.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
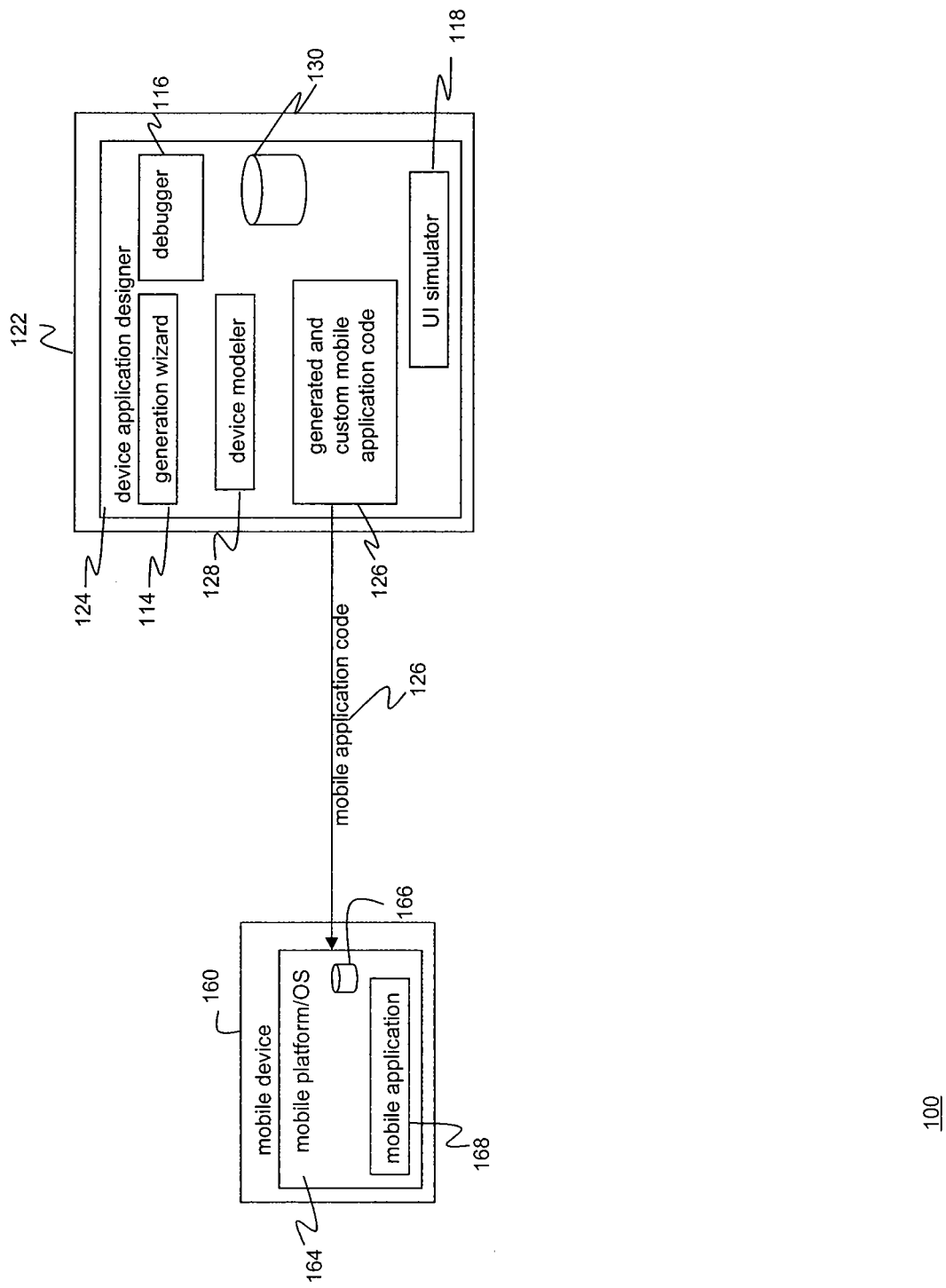
FIG. 1 depicts a system for designing and developing applications for a mobile device, in accordance with an embodiment of the present invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

Overview of the Invention

The present invention is directed to embodiments for visual development of mobile applications. A mobile application is any application that can run on a mobile device, including those presently known and those developed in the future. A mobile device may be one of many devices, such as, but not limited to, personal digital assistants ("PDAs"), IPHONEs, IPOD touch devices, devices operating according to the Microsoft Pocket PC specification with the MICROSOFT Windows CE operating system (OS), devices running the MICROSOFT Windows Mobile Standard OS, devices running the MICROSOFT Windows Mobile Professional OS, devices running the Android OS, devices running the Symbian OS, devices running the PALM OS, mobile phones, BLACKBERRY devices, smart phones, hand held computers, palmtop computers, laptop computers, ultra-mobile PCs, and other wireless mobile devices capable of running mobile applications.

As used herein, an application is any software program or web service that can be executed or run on a server, computer, or mobile client device. An application includes at least a rendering component, execution logic, and Input/Output (I/O) parameters. An application's execution logic may be in the form of binary executable code or scripting programming/ markup languages such as WinMobile C#, Objective-C, Java, JavaScript, HyperText Markup Language (HTML), Extensible HTML (XHTML), or AJAX (Asynchronous JavaScript and XML). One of skill in the relevant arts will appreciate that other programming languages and technologies can be used for an application's execution logic.

Unless specifically stated differently, a developer is interchangeably used herein to identify a human user, a software agent, or a group of users and/or software agents. Besides a human developer who needs to design and debug mobile applications, a software application or agent sometimes generates and validates mobile applications. Accordingly, unless specifically stated, the term "developer" as used herein does not necessarily pertain or refer to a human being.

In one embodiment, the device application designer tool employs a code generation pattern for building platform-specific applications based on a data model corresponding to a selected target platform. The data model represents operational characteristics of a mobile platform, pre-defined application screens for the platform, mobile devices supported by the platform; and default input controls for mobile devices supported by the selected platform. In an embodiment, respective data models for a plurality of mobile device platforms are defined as a respective plurality of extensible markup language (XML) files. For example, a data model corresponding to the data model for the BLACKBERRY/ Research in Motion (RIM) platform can include XML code indicating, operational characteristics of the BLACKBERRY/RIM platform, pre-defined application screens for the BLACKBERRY/RIM platform, specific BLACKBERRY devices supported by the BLACKBERRY/RIM; and default input controls for each of the BLACKBERRY devices supported by the BLACKBERRY/RIM platform.

In an exemplary embodiment, if a BLACKBERRY/RIM platform is selected, the device application designer tool generates RIM-specific Java code for a BLACKBERRY device. In an alternative embodiment, if a Windows Mobile operating system is selected as the platform, WinMobile C# code is generated by the tool for smart phones and mobile devices running a Windows Mobile operating system (OS). In another embodiment, if an IPHONE platform is selected, Objective-C code is generated for applications running in an IPHONE OS developed by Apple Inc. for an IPHONE or IPOD touch mobile device.

As some mobile applications may not be completely implemented using the device application designer tool, the tool includes an interface that enables developers to modify generated code. For example, the tool may include a source code editing interface enabling a developer to insert additional code into the generated code in order to implement additional logic.

In an embodiment, the device application designer tool is part of the SYBASE Unwired Platform (SUP), formerly the Unwired Enterprise Platform (UEP). The UEP is described in greater detail in U.S. patent application Ser. No. 11/882,749, entitled "Unwired Enterprise Platform," filed Aug. 3, 2007, which is herein incorporated by reference in its entirety.

The invention enables a developer to visualize and test applications developed for multiple devices and platforms before they are deployed to and installed on the actual mobile devices. Mobile devices 160 may be any existing or future mobile device, and may be operating from any location.

Systems for Visual Generation of Mobile Applications

Figure 2:
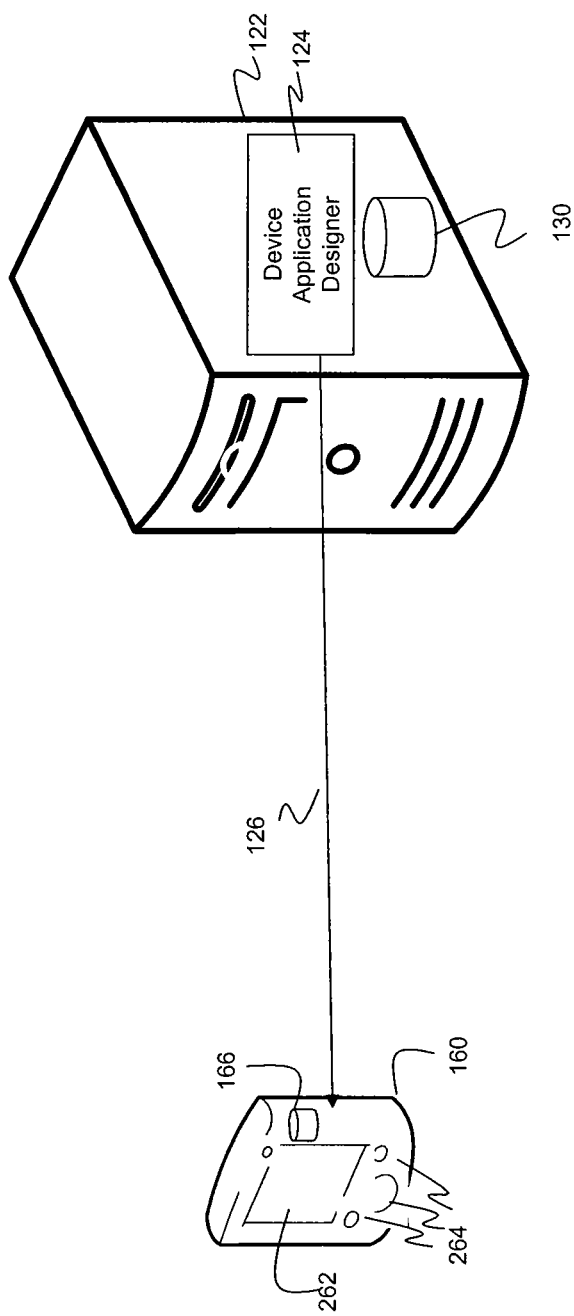
FIG. 2 illustrates a modular view of a mobile device application design and development system, in accordance with an embodiment of the present invention.

In the exemplary mobile application design systems 100 and 200 depicted in FIGS. 1 and 2, a mobile application which has been designed and generated using device application designer 124 for platform 164 is deployed to mobile device 160.

FIG. 1 depicts a system 100 for visually designing, developing, and debugging applications for a selected mobile device 160 and platform 164, in accordance with an embodiment of the present invention. The device application design system 100 includes a device application designer 124 with a generation wizard 114, debugger 116, user interface (UI) simulator 118, device modeler 128, and data store 130. In an embodiment, device application designer 124 is a software tool or application hosted on server 122 as depicted in FIG. 2. In an alternative embodiment, device application designer 124 is hosted by a remote server (not shown) from a desktop client machine. Similarly, components of the device application designer 124 such as generation wizard 114, debugger 116, UI simulator 118, device modeler 128, and data store 130; may be hosted locally on server 122 or may be distributed amongst one or more remote servers (not shown).

Although a single mobile device 160 is depicted in systems 100 and 200, it is understood that device application designer 124 can be used to design, generate, and test applications for a plurality of disparate mobile devices 160 and platforms 164.

In an embodiment, device application designer 124 is configured to access a plurality of data models corresponding to mobile devices 160 and platforms 164. In another embodiment, platform plug-ins indicating platform-specific properties for platforms 164 are accessed from data store 130. These platform plug-ins contribute platform-specific properties to the mobile application 168 and the mobile application 168 screen controls and stock screens. In other embodiments, stock images, stock screens, stock styles, and system variables for platforms 164 and mobile devices 160 are stored in data store 130 for use by device application designer 124. In one embodiment system styles corresponding to platforms 164 are also stored in data store 130 so that the pre-defined styles are available to designers.

In an embodiment, generation wizard 114 is a multi-page wizard, which allows a developer to select a platform 164 and a target mobile device 160. The selection of a platform 164 and a mobile device 160 causes the generation wizard 114 to map the current selected device 160 to the correct UI simulator 118 and device modeler 128. This mapping is described below with reference to FIG. 5. In one embodiment, the first page of generation wizard 114 allows a developer to pick the platform 164 to generate mobile application code 126 for mobile application 168. According to an embodiment, a default platform is mapped based upon the mobile device 160 picked in a screen design interface. An exemplary screen design user interface (UI) is described below with reference to FIG. 6. Other details of generation wizard 114 are described below with reference to FIGS. 12 and 13.

Mobile application 168 comprising mobile application code 126 is deployed to mobile devices 160 via connectivity to multiple diverse and disparate wired and wireless networks, including but not limited to WiFi, 2G/2.5G, WiMAX, Wired, and 3G. Other wired and wireless mediums will be apparent to persons skilled in the relevant art(s), and fall within the scope of the present invention.

As illustrated in FIG. 1, mobile device 160 may comprise a local data store 166. In an embodiment, mobile application 168 comprising mobile application code 126 is deployed to device 160 is stored in local data store 166.

As depicted in FIG. 2, mobile device 160 may further comprise a display 262 and an input device 264. According to embodiments of the present invention, input device 264 can be, but is not limited to, for example, a touch screen, a keyboard, a pointing device, a track ball, a touch pad, a joy stick, a voice activated control system, or other input devices used to provide interaction between a user and mobile device application 168. Input device 264 can be used by a user of mobile device 160 to launch newly-deployed and installed mobile applications 168.

Additionally, existing mobile applications 168 that have previously been deployed to mobile device 160 can be executed and displayed on display 262.

Accordingly, mobile applications 168 operate on mobile devices with varying levels of hardware and platform capabilities and in a heterogeneous network environment with varying degrees of reliability, bandwidth, latency, connectivity, etc. According to embodiments of the invention, device application designer 124 takes into consideration the characteristics of the diverse mobile devices 160 and their respective platforms 164. Features of generation wizard 114, debugger 116, UI simulator 118, and device modeler 128 are described below with reference to FIGS. 3-5.

The device application designer 124 allows applications for a variety of devices 160 and platforms 164 to be visually designed, debugged, and modified in a single tool. By doing so, the device application designer 124 provides a single context hides the complexities of implementing mobile applications 168 across an increasing range of mobile devices 160 and platforms 164.

Mobile Application Generation Methods

Figure 3:
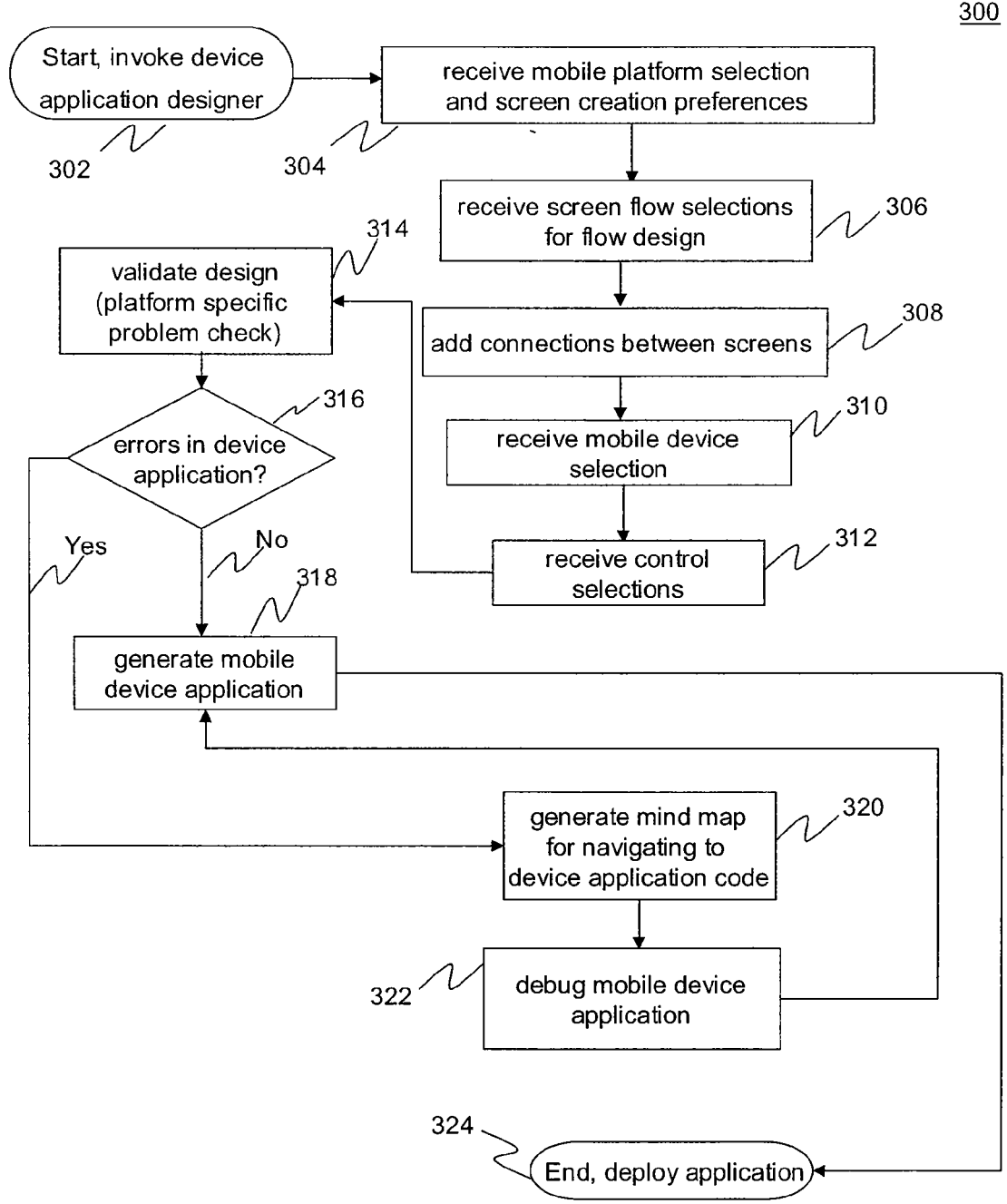
FIG. 3 is a flowchart illustrating steps by which an application is designed for a mobile device, in accordance with an embodiment of the present invention.

FIG. 3 is a flowchart 300 illustrating steps by which an application design method is used to design and generate an application for a mobile device, in accordance with an embodiment of the present invention.

More particularly, flowchart 300 illustrates the steps by which an application is designed and developed for a selected mobile platform and device, according to an embodiment of the present invention.

FIG. 3 is described with continued reference to the embodiments illustrated in FIGS. 1 and 2. However, FIG. 3 is not limited to those embodiments. Note that the steps in the flowchart do not necessarily have to occur in the order shown.

The method begins at step 302 when a device application designer tool is invoked. In an embodiment, device application designer 124 depicted in FIGS. 1 and 2 is accessed by a developer in step 302. According to an embodiment of the invention, the device application designer tool makes automatic entries in some data fields in the generation wizard 114, such as a parent folder for generation wizard 114. In one embodiment, the parent folder is a directory within data store 130 under which generated mobile device application code 126 associated with a mobile application 168 is saved.

After the tool is invoked, a user interface for the device application designer is launched and method proceeds to step 304.

In step 304, selections of mobile application 168 screen creation preferences are received from a preferences interface. In this step, a file name for the mobile application can be entered. In step 304, a developer can link the mobile application code 126 being generated to one or more files in data store 130. In this step, a platform 164 for which the mobile application 168 is being created is selected. These selections determine which application features are available to be generated in subsequent steps in the method illustrated in flowchart 300. In an embodiment, the selection of a platform 164 causes device application designer 124 to access a data model associated with the platform. In an embodiment, the data model is accessed from data store 130. The default device 160 is set based upon the selected 164. Once the selections of the target platform 164 and screen creation preferences are made, the method proceeds to step 306.

In step 306, a flow design interface in the device application designer is used to create a flow design for custom and pre-defined mobile application screens. An exemplary flow design interface is described below with reference to FIGS. 18 and 19. In an embodiment, a flow design is selected, which allows selection of a mobile application screen from a set or 'palette' of pre-defined screens in a menu. The pre-defined screens presented in the menu are based upon the data model accessed in step 304. The flow design can be visually generated in this step. For example, pre-defined screens can be dragged and dropped from the palette onto a flow design 'canvas' within device application designer 124. In step 306, additional screens can be added to mobile device application 168, as needed. In this step, connections between the screens can also be selected. In step 306, in a UI in device application designer 124, a developer can add controls and actions to the screens of mobile application 168. In an embodiment, a flow design UI of device application designer 124 is used in this step to create a flow design for custom mobile application 168 screens. In step 306, the flow design UI can also be used to add and connect screens, as well as customized stock screens. Once the initial flow design of mobile application 168 is complete, the method proceeds to step 308.

In step 308, additional connections are created between screens within mobile application 168. In one embodiment, in a flow design page within device application designer 124, a selection of a connection type from a set or palette of connection types is made. In this step, a developer can, using an input device, select a source screen and drag to connect it to a target screen. In an embodiment, this step can be performed using an interactive interface which allows a designer to hide details of connections to other screens within the flow design by collapsing screens to icons and expand the screen views to show both the screens and any connections to other screens. Connections between screens created in step 306 will not work until they are used in an action attached to a menu, button, or until another control is selected. The selection of controls occurs is described below with reference to step 312. In an embodiment, a UI displays a connection line between screens that are connected in this step. Once the additional connections are created, the method proceeds to step 310.

In step 310 a mobile device 160 is selected. The properties of display 262 of the selected mobile device 160 are used to format a screen designer UI specifically for the selected mobile device 160. In an embodiment, once a mobile device 160 is selected, an empty canvas is displayed in a screen design UI, wherein the empty canvas is formatted for the selected device 160. According to one embodiment, a mobile device 160 is selected from a drop-down list. In this step, if a specific mobile device, an orientation icon is activated so a developer can select the orientation for the selected device 160. For example, if a BLACKBERRY STORM™ is selected, horizontal and vertical orientations are available in the canvas. If a specific mobile device 160 is not selected in step 310, the default device set in step 304 is used, but the default device screen is displayed as a much larger canvas in the screen design UI. This makes it easier to add additional controls to screens that have containers that occupy most of the screen design UI display. Once the mobile device 160 is selected, the method proceeds to step 312.

In step 312, controls and their corresponding control events are added to the application screens added in step 306. In an embodiment, a screen design palette is used to add controls to mobile device application screens. In this step, a menu, button, or other controls for the connections between screens are selected. A properties page for can be used to configure the controls added in this step. In an embodiment, the types of controls available in the screen design palette varies depending the platform 164 and device 160 selected in steps 304 and 310, respectively. For example, if the selected device 160 is an IPHONE or IPOD touch device, a 'wheel' control is available for selection. Similarly if the selected platform 164 and device 160 supports a touch screen UI, touch screen controls can be selected in step 312. In an embodiment of the invention, control events are selected for one or more of the controls added in this step. Control events, or event hooks include, but are not limited to, those shown in Table 1.

corresponding control events (i.e., event hooks) are selected, the method proceeds to step 314.

In step 314, the design of the mobile device application 168 to be generated is verified. In an embodiment, platform specific problem checking is performed in this step based upon the platform 164 selected in step 304. For example, if a RIM/BLACKBERRY platform has been selected, step 314 will perform personal information manager (PIM)-type checks on the PIM actions that are supported by the RIM/BLACKBERRY platform. The validation in this step may result in detection of configuration problems with platform-specific actions. In an embodiment, developers can also contribute or add problem checks for a given platform 164 by returning implemented problems in the platform's getPlatformProblems( ) method. In this way, any new problem checks for a platform 164 can be added into the device application designer 124. These problems will automatically be added into the preferences system for platform problems so that the severity of the problem can be configured. In one embodiment, depicted in the code sample below, problems can only be added for checking and the actions performed by content assist are not extensible. The problems detected in

TABLE 1

Control Events for Controls Applied to a Mobile Device Application

| Event Name | Description |
| --- | --- |
| onLoad | Event is called in response to loading the control is loaded. For example in, in an email/PIM mobile application, an inbox button may be edited to show the button as an envelope icon with a number indicating the number of unread mail before the button is displayed |
| onClick | Event is called in response to detecting that a control has been acted upon. This may be used for showing tool tip (i.e., interactive, context-aware help), or expanding a table cell/row to show additional information for the cell/row (i.e., to show additional contact information when a user navigates to a contact record in an address book). |
| onValueChange | Event is called in response to detected a value change of an input control. This could be handy for linked parameters in that the values of a control change based on the selected value of another control. |
| onSelectionChange | Event called when a selection of a table or list detail is detected. This event can be used for enabling or disabling menu items, activating phone actions, etc. |
| onOrientationChange | Event code is called in response to detecting an orientation change of the mobile device (i.e., landscape versus portrait, horizontal versus vertical). May trigger a redraw of the mobile application screen/UI. |
| onDraw | Event called when the control or container is called to paint the object. |

In an embodiment, control events can be supported in two different levels. For the first level, an "Events" property page may be displayed which allows developers to provide the location and method name of any platform-specific source for the control events for specific platforms 164 for each control added in step 312. During the code generation described below with reference to step 318, the provided source can be linked into a device client corresponding to the mobile device 160 selected in step 310. According to an embodiment, a second level, event scripting, abstracts controls and persistence layers into JavaScript objects. In this way, JavaScript can be generated for manipulating controls and data on a display 262 of mobile device 160. The JavaScript can be converted into mobile application code 126 when the client for device 160 is generated. For example, when an IPHONE client is generated, the script may be converted into Objective-C code. In this way, the same JavaScript can work on multiple platforms 164. After controls are added and their step 314 are automatically placed under the platform name corresponding to platform 164 in the problems preferences for setting default values.

The following code is an embodiment for adding problem checks for a platform. In this embodiment (from a device application design tool entitled 'Bob'), a problem can be added for actions including editing or removing. As would be appreciated by one of skill in the relevant arts, other programming languages and technologies can be used to implement the problem checking in the programming language code sample below.

```
/**
 * Platforms can add problem checks. These problems will automatically
 be added
 * into the preferences system for platform problems for configuration
``` of the severity.
*
* NOTE: problems can only be added for checking, the actions performed by content assist
* are not extensible. However, in most cases this is not necessary.
*
* For extensible objects like actions, If the problem is for your action,
* you would assign the problem to the check type for a "CHECK_TYPE_MENUITEM_PLATFORM_ACTION" or
* "CHECK_TYPE_PLATFORM_ACTION" (widgets). This will give the content
assist for edit, remove the action.
* On edit, the action is opened with the problem check type and should fix the problem.
*
*/
public interface IBobProblem
{
    /**
    * Get the id to use for this marker. This is used as the key for
the preference.
    * @return
    */
    public String getId( );
    /**
    * Get the type of marker this should be added in to for checking. This is one of the
    * marker types defined in IBobMarkerConstants. i.e. FLOW_DESIGN_PROBLEM, SCREEN_DESIGN_PROBLEM, etc.
    * @return marker type
    * @see IBobMarkerConstants
    */
    public String getMarkerType( );
    /**
    * Get the message to display without arguments. This is used in the preference settings
    * so the user can figure out what severity to set. This would be the resource, string without
    * message format, i.e.
    * com.sybase.uep.bob.flowdesignmarker.screen=Screen {0} is not valid.
    * The id would be: com.sybase.uep.bob.flowdesignmarker.screen
    * The message would be: Screen {0} is not valid.
    *
    * @return
    */
    public String getMessage( );
    /**
    * Get the default severity assigned for this problem id. This will be used with the preference
    * system to assign defaults.
    * @return
    */
    public int getDefaultSeverity( );
    /**
    * Check the bob document using the given checker (checker assigned will be type returned from
    * getMarkerType( )). The problem should be added into the checker via the reportCheckResult( )
    * @param checker checker to use.
    * @param bob editor
    * @see getMarkerType( )
    * @see BaseBobChecker.reportCheckResult( )
    */
    public void checkProblem(BaseBobChecker checker, BobEditor bob);
    /**
    * Check the bob document using the given checker (checker assigned will be type returned from
    * getMarkerType( )). The problem should be added into the checker via the reportCheckResult( )
    * @param checker
    * @param bob
    * @param localePath locale to check if the problem is extending the locale checker.
    * @see getMarkerType( )
    * @see BaseBobChecker.reportCheckResult( )
    */
    public void checkProblem (BaseBobChecker checker, BobEditor bob,
    IPath localePath);
}

In an embodiment, a modeling tool is used in step 314 to provide platform and device specific validation and allows for correction of various aspects of the mobile application code 126, including device specific features, and errors in connections between screens created in step 308. After the design is validated, control is passed to step 316.

In step 316, an evaluation is made regarding whether there are errors in the mobile device application 168 to be generated. This step is performed by verifying the mobile application code 126 associated with the mobile device application 168 to be generated. If it is determined that there are no errors, control is passed to step 318 where the mobile device application 168 is generated. If it is determined that there are errors in the mobile device application, control is passed to step 320 where the application is debugged.

In step 318, a mobile device application 168 is generated. In an embodiment, in this step, generation wizard 114 generates mobile application code 126 based upon the selections made in steps 302-312. For example a multi-page generation wizard 114 may be invoked to generate mobile device application 168. The first page of generation wizard 114 may allow the developer to pick the platform 164 to generate the application for. If no selection is made in the wizard, a default platform 164 will be mapped based upon the device 160 picked in step 310. In this step, a locale may also be selected in the wizard. The locale section contains the locales defined for the selected platform 164 and device 160. The locale section of generation wizard 114 is disabled if localization capability is not supported by the selected platform 164. Another section of generation wizard 114 contains areas of checking that are generic to all platforms 164. When a platform 164 is selected the next button will bring up that platform's specific generation wizard 114 page(s). After completion of the generation wizard 114 pages, mobile device application 168 is generated and control passes to step 324.

In step 320, a 'mind map' of mobile device application 168 is generated so that a developer can readily navigate to different pieces of mobile application code 126 where errors were detected in step 316. In an embodiment, in this step, functional components of mobile device application 168 are depicted as an interactive mind map so that a developer can select one or more functional components in order to inspect the underlying source code and help files. In the mind map generated in step 320, functional components of mobile device application 168 are linked to corresponding mobile application code 126. The mind map can be used in conjunction with a debugger in step 322 to link to portions of generated mobile application code 126 that needs to be fixed. Step 320 is described in greater detail below with reference to FIG. 4. After the mind map is generated and displayed, control is passed to step 322.

In step 322, a debugger is invoked to fix and test errors detected during step 314. In an embodiment, debugging is performed in a platform neutral way by using an agent based approach to integrate platform simulators with debugger 116 in device application designer 124. In an embodiment, platform simulators comprise a UI simulator 118 and device modeler 128 corresponding to the selected device 160 and platform 164. In an embodiment, the debugging of the mobile application code 126 is performed by debugger 116 in conjunction with a simulator configured to simulate the behavior of the combination of the selected device 160 and platform 164. However, as an agent is used by the platform simulator, the debugging performed in this step is independent of the device type being debugged because of the abstraction between debugger 116 and the simulator. The debugging performed by debugger 116 is described in greater detail below with reference to FIG. 5. After the mobile application code 126 is debugged and errors are fixed, control is passed to step 318 where the mobile application 168 is generated.

In step 324, the generated mobile device application 168 is ready to be deployed to a mobile device 160. In step 324, the developer may identify additional software components that are required on device 160 to properly execute the generated mobile device application 168. For example, the developer may identify an operating system upgrade, patch, library, plug-in, etc., that is required to be installed on device 160 so that the application 168 will properly execute on the device 160. The listing or identity of such required components is considered to be metadata associated with the application designed and developed in steps 302-322. In step 324, such metadata may be stored in data store 130 so that it can be deployed with the application 168. In an embodiment, the developer provides the metadata to an administrator who stores the metadata in a metadata repository within data store 130. In one embodiment step 324 is performed at some later time, when device 160 that is connected to a network and requests that the application 168 be installed. Once the application 168 is deployed and installed, the process ends.

Friendly Code Generation with Inspection and Assistance

This section describes embodiments of the invention for a tool to generate and graphical image that can guide the developer to either the code generated or the help files corresponding to the framework libraries that are leveraged by the device application designer to generate the application. In an embodiment, the tool generates and displays an interactive visual representation, or 'mind map', that enables developers to navigate to generated code and/or help documents corresponding to various aspects of a mobile application previously generated by the device application designer.

In an embodiment, device application designer 124 employs a code generation pattern for building device-specific applications 168 based on a selected target device 160. As many of the applications 168 are not completely implemented using the visual design process 300 described above, the generated code often needs to be modified so that code can be inserted to implement additional logic or to fix errors in an application 168. Due to the large amounts of code that is generated, it is difficult for a developer to parse through all the mobile application code 126 to determine how the mobile device application 168 modeled in the device application designer 124 matches up with particular subsets of code so that code can be modified at correct place (i.e., in the correct functional component) without causing side effects.

Figure 4:
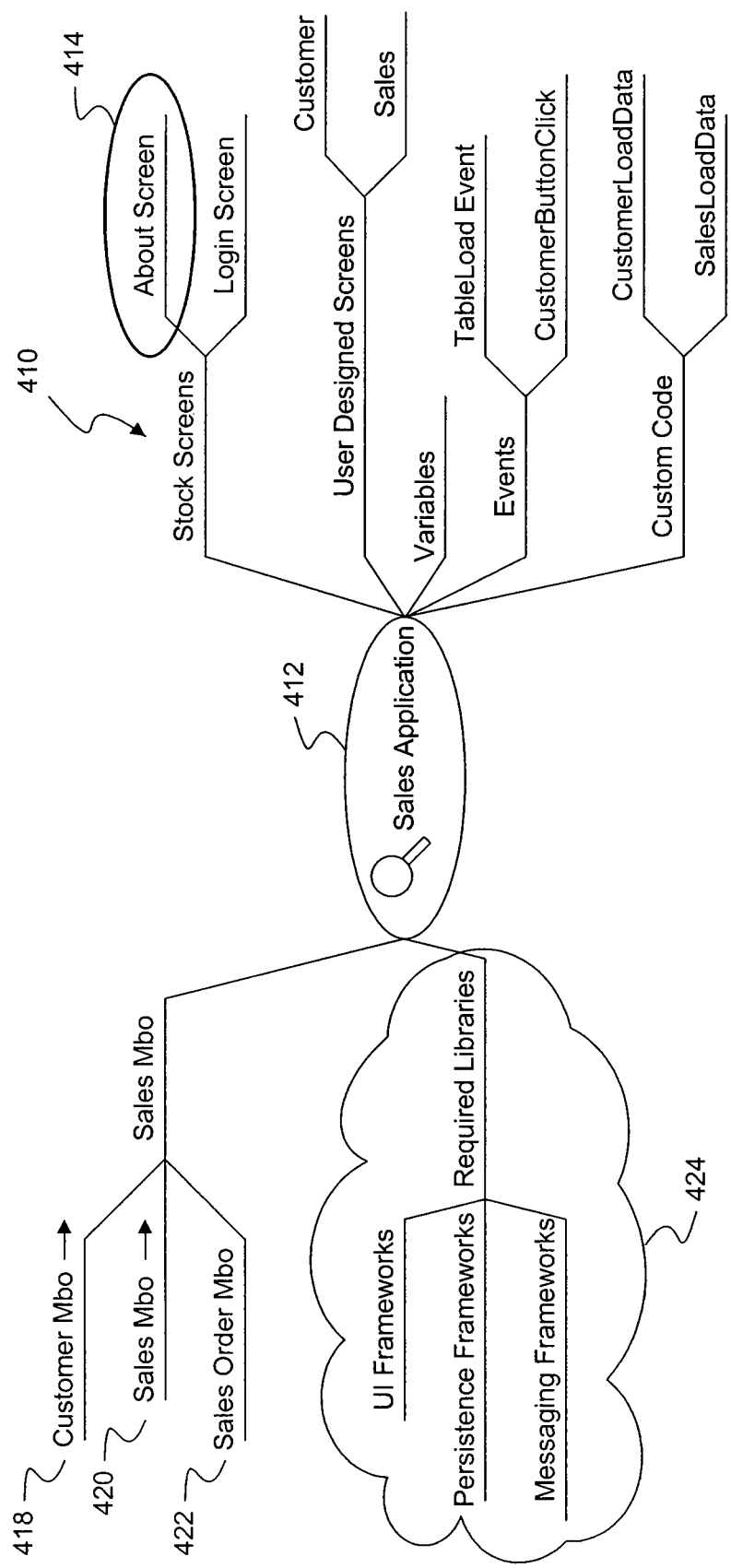
FIG. 4 depicts an interface for navigating to different portions of a mobile device application source code, in accordance with an embodiment of the present invention.

FIG. 4 depicts an interactive mind map 410 for navigating to different pieces of the mobile application source code 126. FIG. 4 is described with continued reference to the embodiments illustrated in FIGS. 1-3. However, FIG. 4 is not limited to those embodiments. Mind map 410 is useful, for example, as a tool for debugging step 322 illustrated in flowchart 300 described above. Mind map 410 is a tool used to allow a user of system 100 and 200, such as a developer, to quickly drill down from functional components of mobile device application 168 to corresponding generated and custom mobile application code 126. In short, mind map 410 provides a way for developers to select portions of source code related to components, such as mobile business objects (MBOs), functions, procedures, libraries, or frameworks of a mobile device application 168. MBOs are described in greater detail in U.S. patent application Ser. No. 12/503,573, filed on Jul. 15, 2009, entitled "Metadata Driven Mobile Business Objects," which is incorporated by reference herein in its entirety.

In the example mind map 410 depicted in FIG. 4, the mobile device application 168 being analyzed is sales application 412. Using an input device similar to input device 264 described above with reference to FIG. 2, a developer can select the About Screen component 414 to link to the code sample provided below.

```
//Define and register the screen
screen4 = newAboutScreen("About");
SCREEN_REGISTRY.put("screen4", screen4);
SETTING_SCREEN_REGISTRY.put("screen4", screen4);
```

By selecting the top-level Sales MBO component 416, mind map 410 links to the generated mobile business office (MBO) code for sales application 412.

More particularly, by selecting a specific MBO such as Customer MBO 418, Sales MBO 420, or Sales Order MBO 422, mind map 410 navigates to Java documents or code for the selected MBO. For example, by selecting Customer MBO 418, a developer can link to the code sample provided below.

```
//MBO: Customers
    addMobileApplication("1", "Customers", "1", "", "Sales:1.0");
    addInitialSyncParameter("1", "state", "", "STRING");
    addMBOAttribute("1", "id", "id", "INT", null);
    addMBOAttribute("1", "fname", "fname", "STRING", null);
    addMBOAttribute("1", "lname", "lname", "STRING", null);
    addMBOAttribute("1", "address", "address", "STRING", null);
    addMBOAttribute("1", "city", "city", "STRING", null);
    addMBOAttribute("1", "state", "state", "STRING", null);
    addMBOAttribute("1", "zip", "zip", "STRING", null);
    addMBOAttribute("1", "phone", "phone", "STRING",
    newLogicalType(
        "phone"));
    addMBOAttribute("1", "company name", "company name",
    "STRING",
null);
```

Selecting UI Frameworks 424 takes a developer to Java documents for the user interface frameworks.

In an embodiment, an interactive mind map 410 is generated by device application designer 124 for all platforms 164 supported by systems 100 and 200, including, but not limited to, Windows Mobile, the IPHONE OS, RIM, the Android mobile operating system, and other platforms 164.

Figure 5:
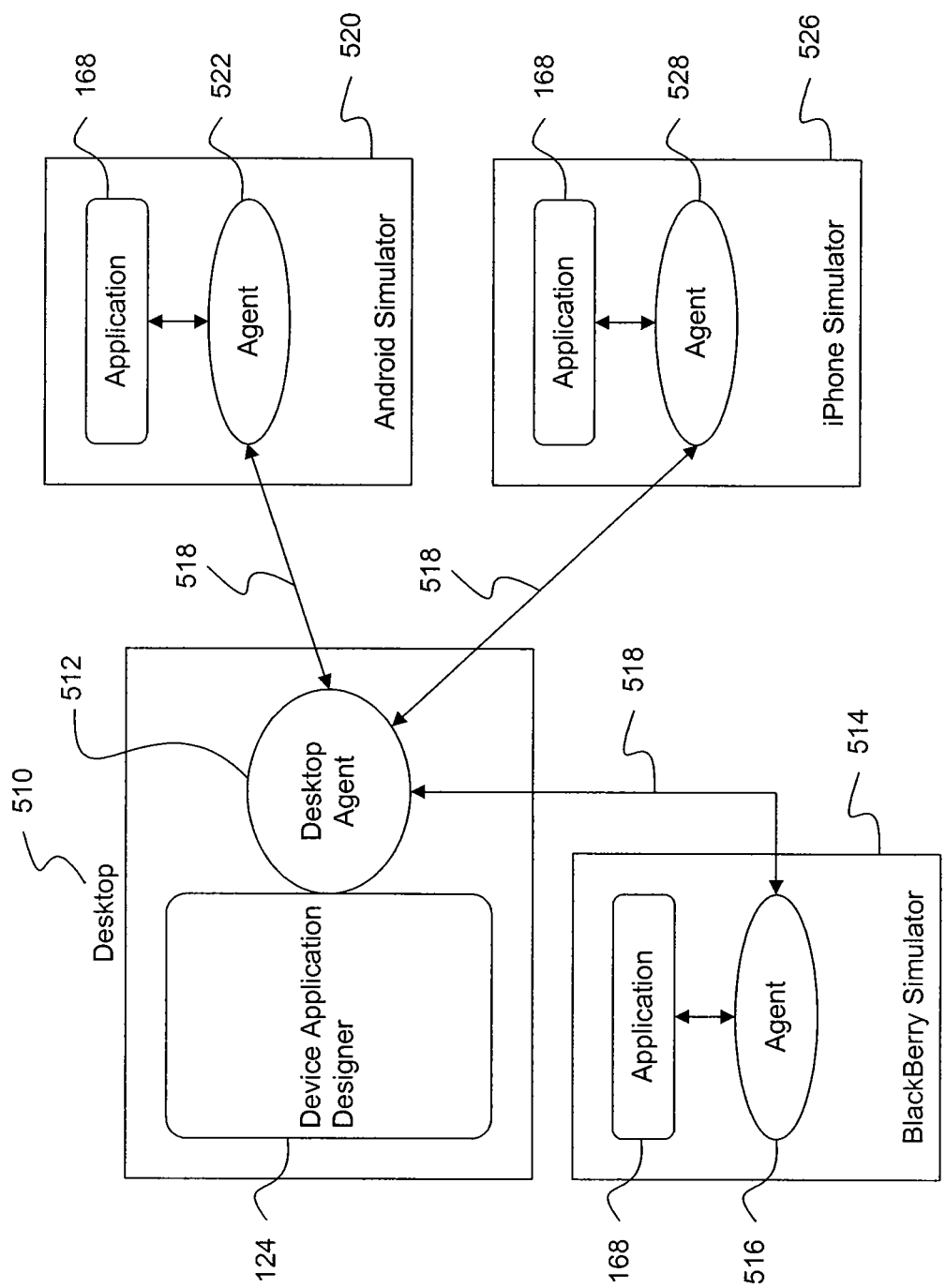
FIG. 5 illustrates a modular view of an agent-based tool for platform-neutral debugging of mobile applications, in accordance with an embodiment of the present invention.

FIG. 5 depicts a modular view 500 of an agent-based tool for platform-neutral debugging of mobile device applications 168. FIG. 5 is described with continued reference to the embodiments illustrated in FIGS. 1-3. However, FIG. 5 is not limited to those embodiments. In an embodiment, the tool depicted in FIG. 5 can be used in the debugging step 322 of the method illustrated in flowchart 300. For example, debugger 116 may comprise the tool depicted in FIG. 5. In an embodiment, debugging of mobile application code 126 is performed on desktop 510 for device application designer 124 using desktop agent 512. Desktop agent 512 communicates information about the mobile device application 168 to one of a plurality of platform simulators via links 518. Each platform simulator comprises an agent, a UI simulator 118, and a device modeler 128. The platform simulator that is launched depends on the target platform 164. For example, BLACKBERRY simulator 514 is launched if the RIM/BLACKBERRY platform 164 was selected in step 304 as part of the method depicted in flowchart 300. Each platform simulator comprises a respective agent used to launch mobile device application 168. For example, as shown in FIG. 5, BLACKBERRY simulator 514 includes agent 516 to launch application 168. BLACKBERRY simulator 514 models the behavior the application 168 as it would appear on the target device 160. In an embodiment, each platform simulator's agent reflects device specific features for the combination of the selected device 160 and platform 164. For example, agent 516 is configured to enable BLACKBERRY simulator 514 to model behavior of application 168 on a specific BLACK-BERRY device 160 selected in step 310 in flowchart 300 in combination with a RIM platform 164 selected in step 304. For example, if a BLACKBERRY STORM™ was selected in step 310, the device-specific behaviors of the selected BLACKBERRY STORM™ device 160 are modeled by BLACKBERRY simulator 514. These behaviors include, but are not limited to, display characteristics for the BLACK-BERRY STORM touch screen display 262, modeling the use of the BLACKBERRY STORM input device 264, comprising buttons and a touch screen.

As shown in the embodiment depicted in FIG. 5, Android simulator 520 comprising agent 522 can be used for debugging when the Android OS platform 164 has been selected as the target platform 164 for application 168. Similarly, in another embodiment, IPHONE simulator 526 comprising agent 528 can be used to debug applications 168 when the IPHONE OS platform 164 was selected in step 304 in the method depicted in flowchart 300. In the example embodiment depicted in FIG. 5, only three platform simulators, 514, 520, and 526 are depicted for three exemplary platforms 164 (e.g., RIM', Android, and IPHONE, respectively). However, as would be appreciated by one of skill in the relevant arts, other platforms 164 can be simulated using platform simulators comprising a UI simulator 118 and device modeler 128 configured to model the operational characteristics of other mobile platforms and operating systems not depicted in FIG. 5.

As desktop agent 512 agent communicates with agents running within each respective simulator, platform-neutral debugging can be performed independent of the selected device 160 and platform 164. This is because of the abstraction from the actual devices/platforms being simulated and the additional level of abstraction between the simulator agents 516, 522, and 528 and desktop agent 512.

Device/Platform Specific View of User Interface Controls

Figure 6:
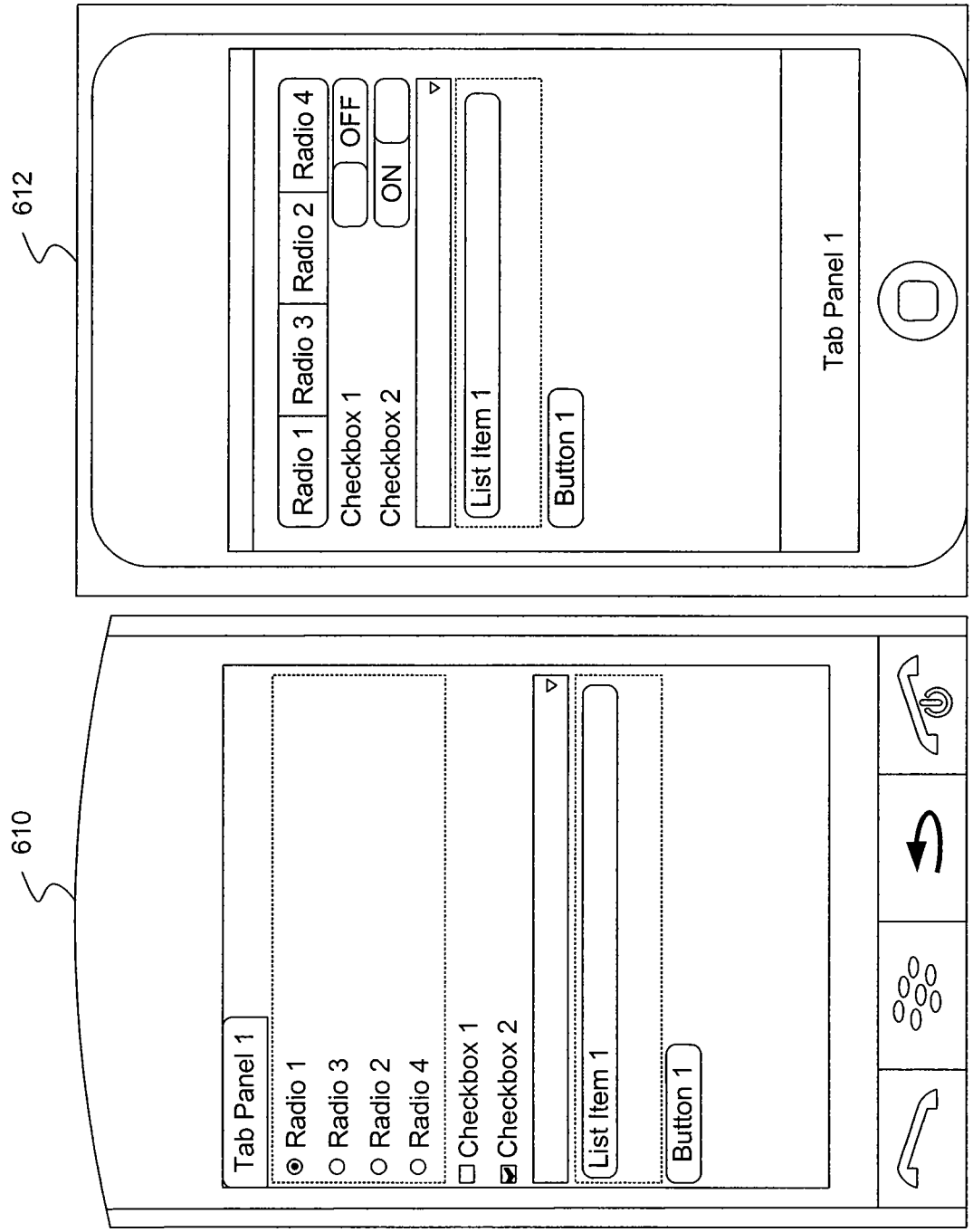
FIG. 6 depicts exemplary platform-specific views of user interface controls, in accordance with an embodiment of the present invention.

This section describes functionality within the device application designer 124 to display various control 'widgets' as they would appear on the selected device/platform combination. In an embodiment, device application designer 124 can provide a developer with a device and platform-specific view of a UI control based on the device 160 and platform 164 chosen. The developer can dynamically change the view of that UI control based on selecting a different device 160 and/or platform 164. This embodiment enables developers to have a realistic view of the UI of an application 168 being designed without having to first execute it on a simulator. In an embodiment, the device application designer 124 provides default views for all controls, regardless of which platform 164 the figure is designed for. Additionally, a platform-specific figure interface is provided for each control widget. Each platform 164 implements an interface to create its own version of views in order to model the look and feel of a selected platform 164 and device 160. Not all platforms 164 support the same widgets. For example, a screen designed for a BLACKBERRY platform might look dramatically different on an IPHONE device. A toggle widget, for example, can be displayed as a checkbox on a BLACKBERRY device, but may be displayed as an on-off switch on devices running an IPHONE OS. The device application designer 124 updates an application editor to show the figure corresponding to the currently-selected platform 164. A default figure may be used if a platform-specific figure is not available for a selected platform 164. FIG. 6 depicts exemplary control widgets for BLACKBERRY STORM controls 610 and IPHONE controls 620. The code sample below provides an example platform-specific interface view for radio button controls.

```
/**
 * This interface contains methods that need to be implemented by radio
button views.
 *
 */
public interface IRadioButtonFigure extends IBaseFigure, IWidgetFigure
{
    /**
     * Sets the RadioButton item.
     * @param bIsSelected      Whether the radio button is checked.
     * @param bReadOnly        Whether the item is read only.
     */
    public void setSelectedState(boolean bIsSelected, boolean
bReadOnly);
    /**
     * Sets the value of the radio button.
     * @param radioValue The display of the radio.
     */
    public void setRadioValue(String radioValue);
}
```

Example Graphical User Interface

FIGS. 7-19 illustrate a graphical user interface (GUI), according to an embodiment of the present invention. The GUI depicted in FIGS. 7-19 is described with reference to the embodiments of FIGS. 1-5. However, the GUI is not limited to those example embodiments, and the embodiments of FIGS. 1-5 are not limited to the example GUI of FIGS. 7-19. For example, the GUI may be interface used for visual design and generation of mobile applications, as described in steps 302-324 above with reference to FIG. 3. The GUI may also be used to generate the mind map 410 with reference to FIG. 4. In an embodiment of the invention, the GUI illustrated in FIGS. 7-19 is displayed on server 122 having a display for device application designer 124.

Although in the exemplary embodiments depicted in FIGS. 7-19 the GUI is shown for designing and generating mobile device applications 168 for BLACKBERRY devices, it is understood that the GUI can be readily adapted to create applications other mobile device platforms and operating systems.

Throughout FIGS. 7-19, displays are shown with various icons, command regions, buttons, menus, links, and data entry fields, which are used to initiate action, invoke routines, launch displays, enter data, view data, or invoke other functionality. The initiated actions include, but are not limited to selecting platforms, selecting devices, selecting device orientation, completing generation wizard 114, and designing screens. For brevity, only the differences occurring within the figures, as compared to previous or subsequent ones of the figures, are described below.

Figure 7:
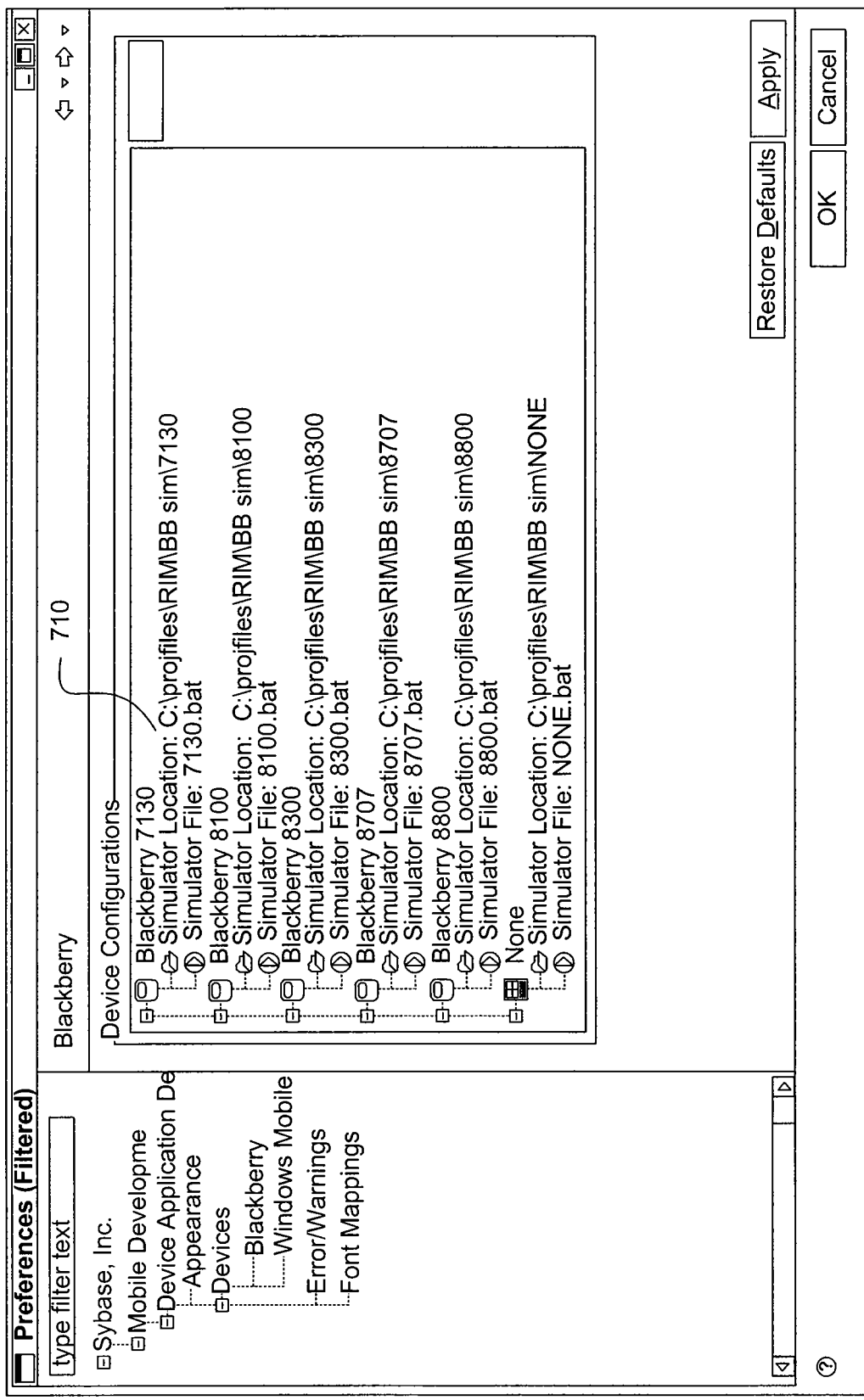
FIGS. 7-19 illustrate an exemplary graphical user interface (GUI), wherein mobile device applications can be designed, generated, and debugged, in accordance with an embodiment of the invention.

FIG. 7 illustrates an exemplary device preference interface 700 for selecting preferences for a device 160. Device preference interface 700 contains only a default device when no platform 164 has been selected. For example, if no platform was selected in step 304, device preference interface 700 will have a default device and list the default device configuration. In the exemplary interface provided in FIG. 7, device preference interface 700 for BLACKBERRY displays simulator configuration mappings 710 for generation wizard 114 to map the current selected device 160 to the correct platform simulator. The platform simulators are identified in mappings 710 by their location within data store 130 and by file name. As discussed above, the platform simulator comprises a device modeler 128, UI simulator 118, and a platform-specific agent. For example, BLACKBERRY simulator 514 will be mapped when a configuration mapping corresponding to a BLACKBERRY device is selected in device preference interface 700.

Figure 8:
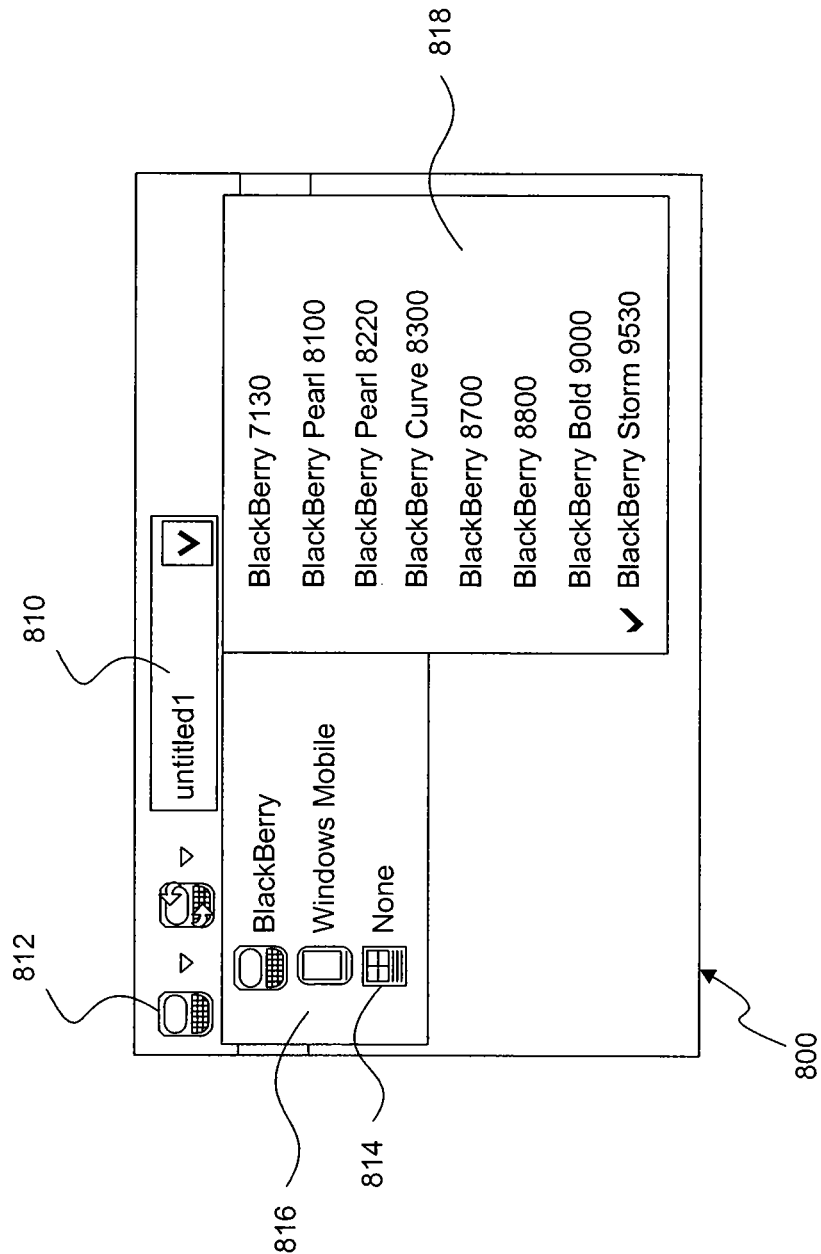

FIG. 8 illustrates a device selection interface 800 for currently selected device type for the screen design as a toolbar entry in toolbar 810. The device 160 is can also be selected under a "Device" property tab (not shown) within device application designer 124. Selection of a device 160 in device selection interface 800 resets the icon 812 in the toolbar 810 to be the platform icon selected. Each platform 164 has its own grouping. The last item, item 814, is for no platform specific tooling (None). The platform icons 816 and device list 818 are used in device selection interface 800 to select both a platform 164 and a corresponding device 160 running a selected platform. When a device type is selected in device selection interface 800, the screen designer is rebuilt with the device skin corresponding to the platform 164.

Figure 9:
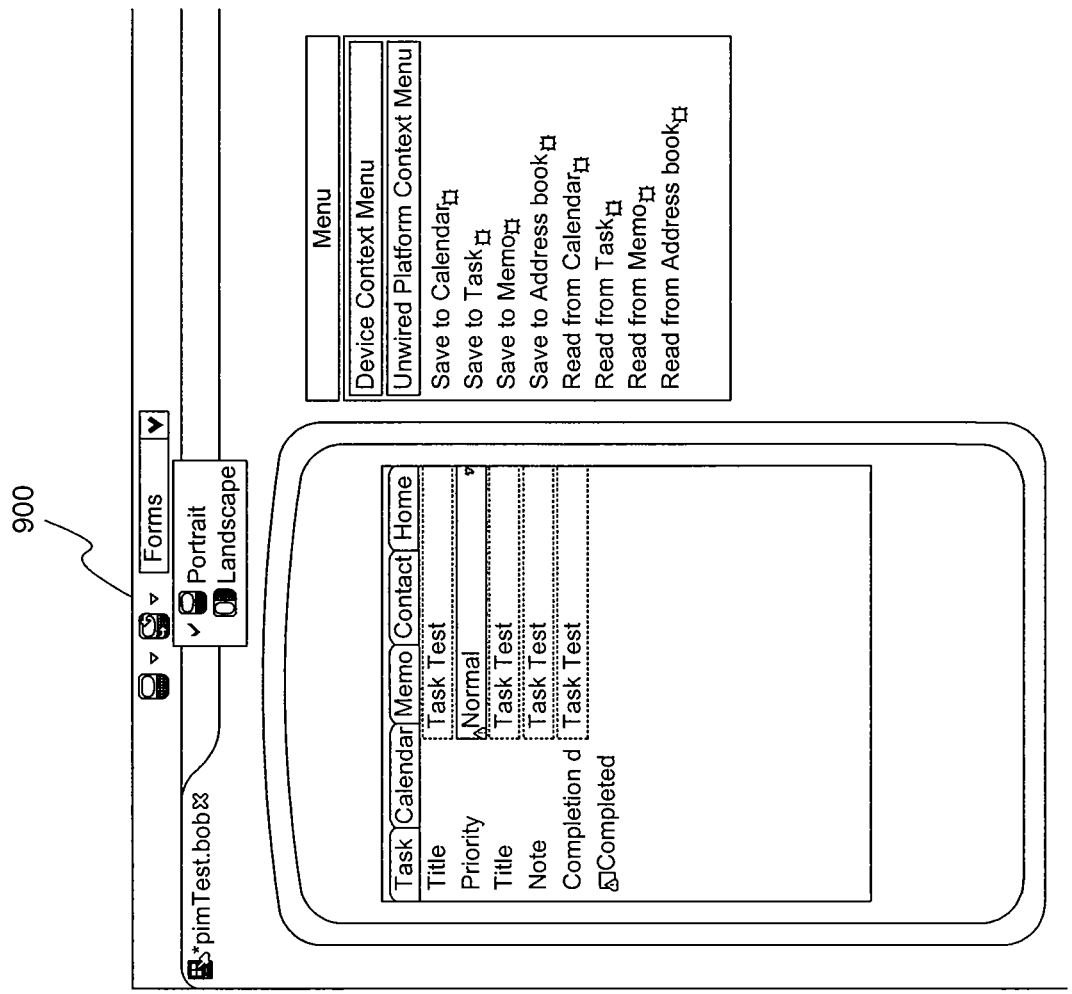
Figure 10:
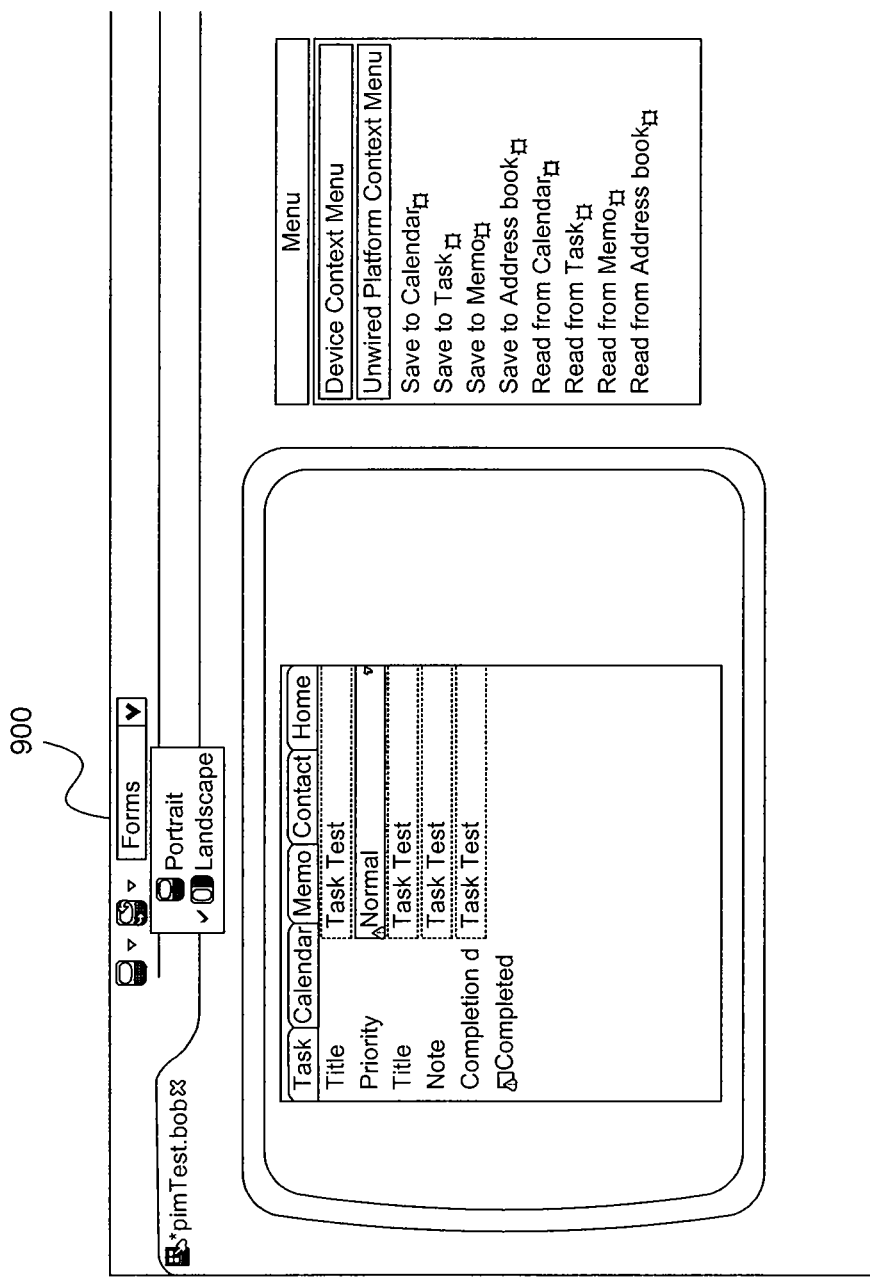

FIGS. 9 and 10 illustrate the orientation toolbar interface 900. If the selected device 160 supports multiple orientations (i.e., vertical and horizontal), applications 168 being designed can be viewed in different modes by selecting the desired orientation in orientation toolbar interface 900. FIG. 9 depicts the vertical orientation view and FIG. 10 depicts the horizontal orientation view. In an embodiment of the invention, Orientation information for each device is defined in an extensible markup language (XML) file within data store 130.

Figure 11:
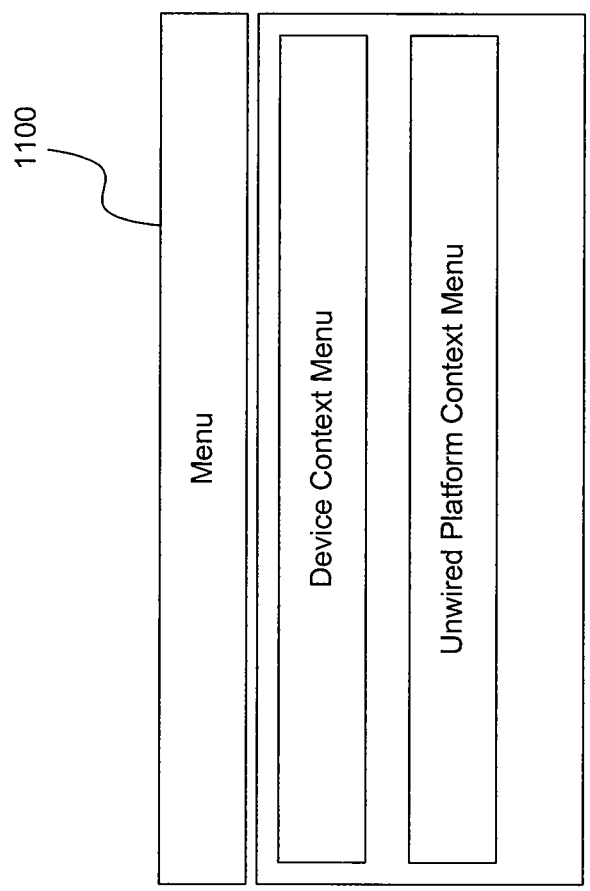

FIG. 11 depicts the menu selection interface 1100. As shown in the exemplary embodiment of FIG. 11, the menu selection has 2 natural groupings. The device context menu area is where device-specific context is added by the selected device 160. For example, the device-specific context may comprise the ways a device performs copy, cut, and paste operations. A developer can add menus between this section and the "Unwired Platform Context Menu" for context menus (i.e., menus that only appear in the context of something being selected). In another embodiment (not shown), the menu system is abstracted on a per-platform basis. That is, menus for each platform 164 can be selected in menu selection interface 1100.

Figure 12:
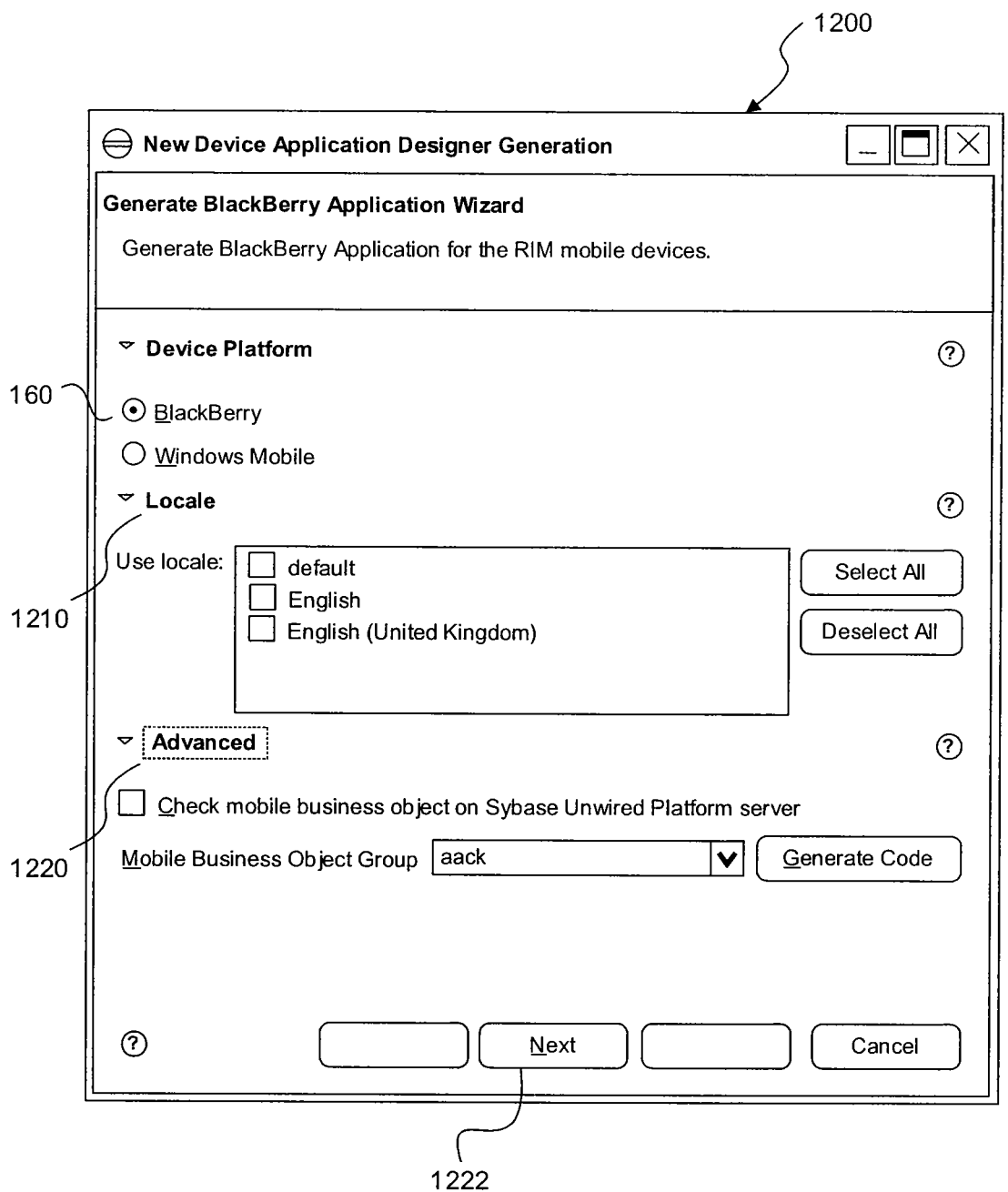
Figure 13:
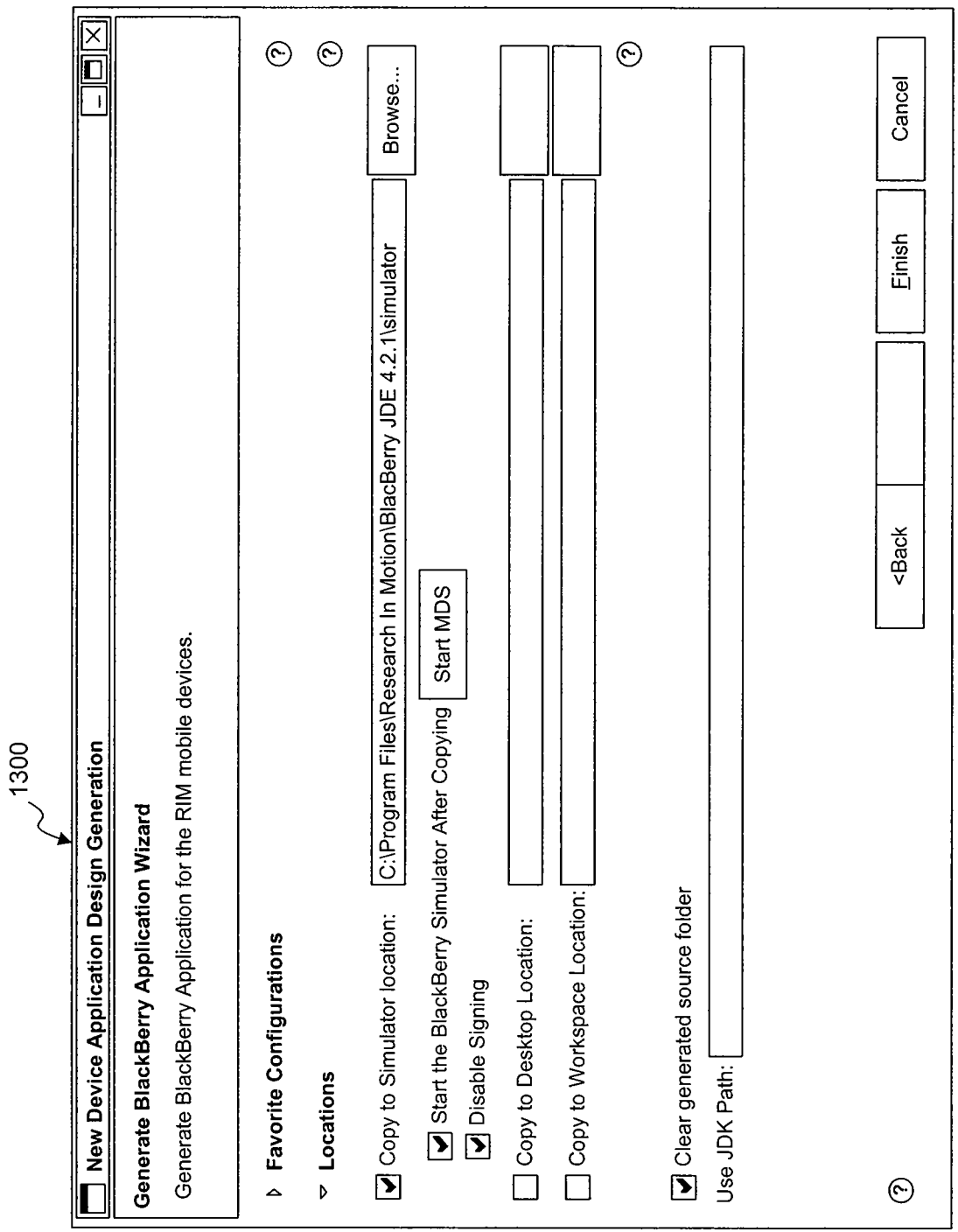

FIGS. 12 and 13 illustrate the generation wizard 114 interface. In the embodiment depicted in FIGS. 12 and 13, generation wizard 114 is a multi-page wizard. The first page, interface 1200, allows a developer to pick the "platform" to generate. The default platform 164 will be mapped based upon the device 160 picked in the screen design.

The locale section 1210 of the interface contains the locales defined for the data model corresponding to the selected platform 164. This section is disabled if localization capability is not supported by the selected platform. The advanced section 1220 contains areas of checking that are generic to all platforms. When a platform 164 is selected, the next button 122 will bring up that platform's wizard page(s). The details of the flow of generation will be described in the wizard page interface. FIG. 13 provides an exemplary BLACKBERRY generation wizard page 1300.

Figure 14:
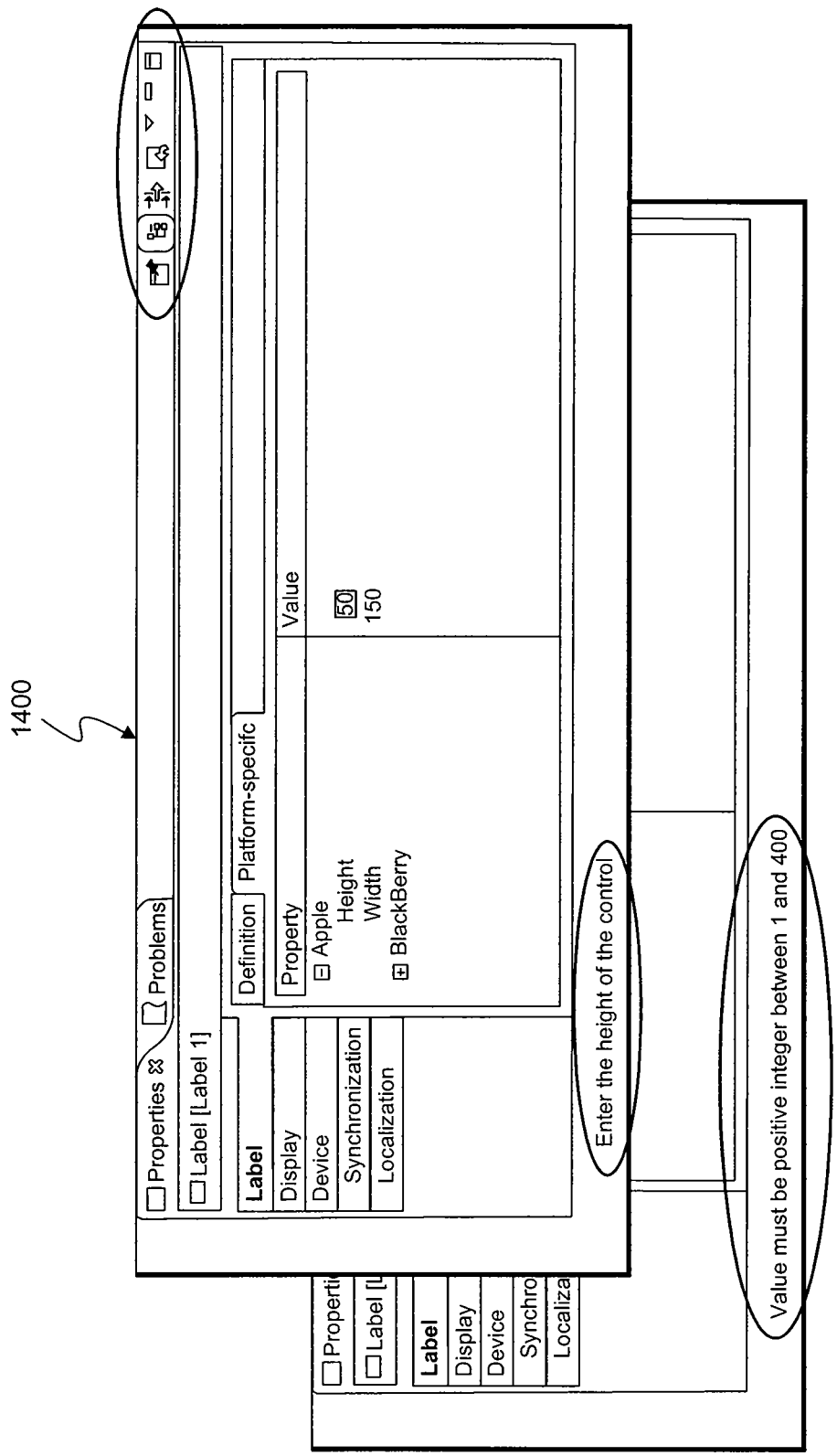
Figure 15:
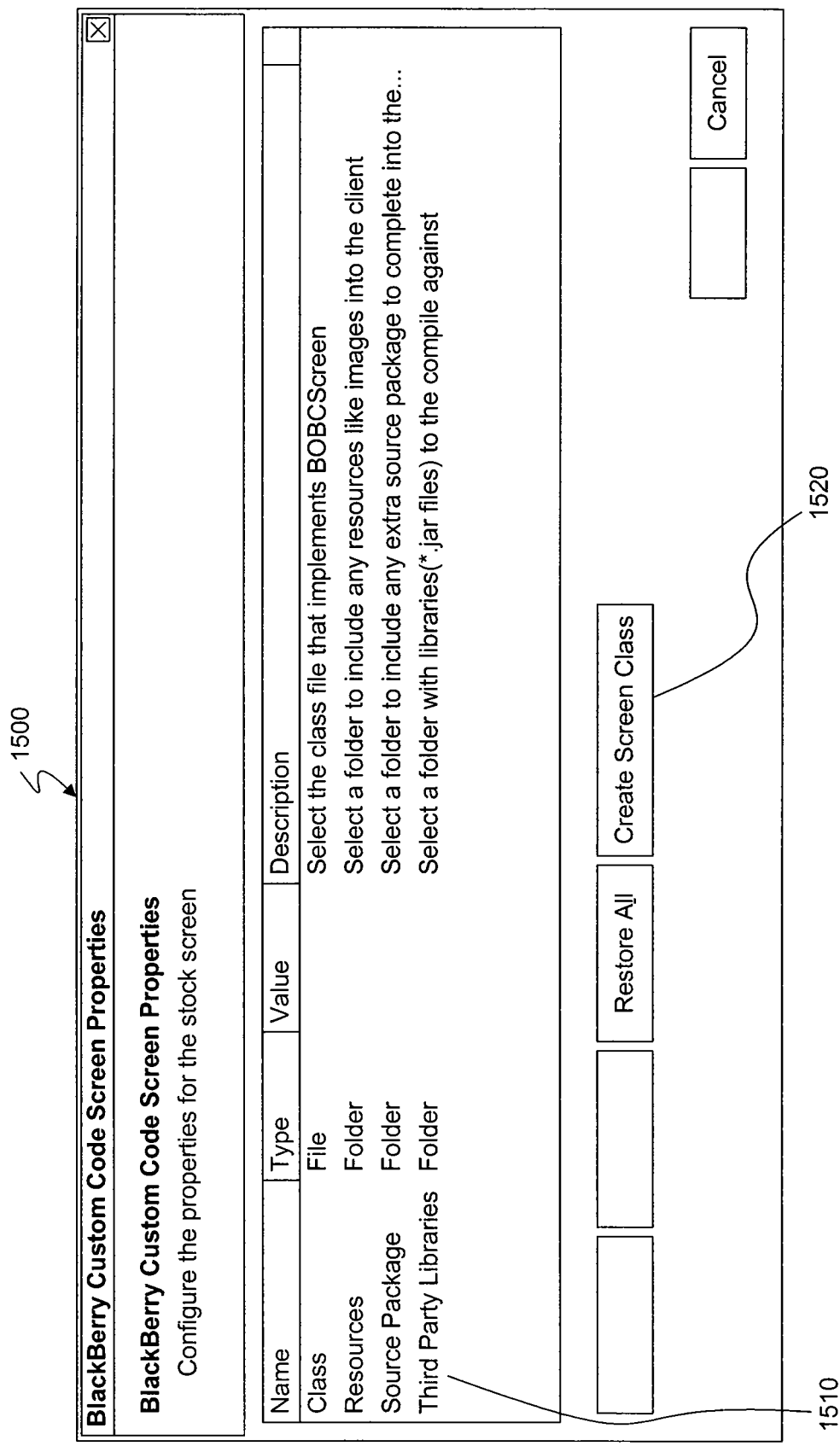

FIGS. 14 and 15 depict an interface for selecting platform-specific properties. As shown in FIG. 14, the height and width properties for a control for a selected platform 164 can be selected in interface 1400. FIG. 15 illustrates a dialog interface 1500 for setting screen properties for a stock screen.

Once the desired properties have been set in window 1510, create screen class button 1520 can be selected to create the corresponding screen class.

Figure 16:
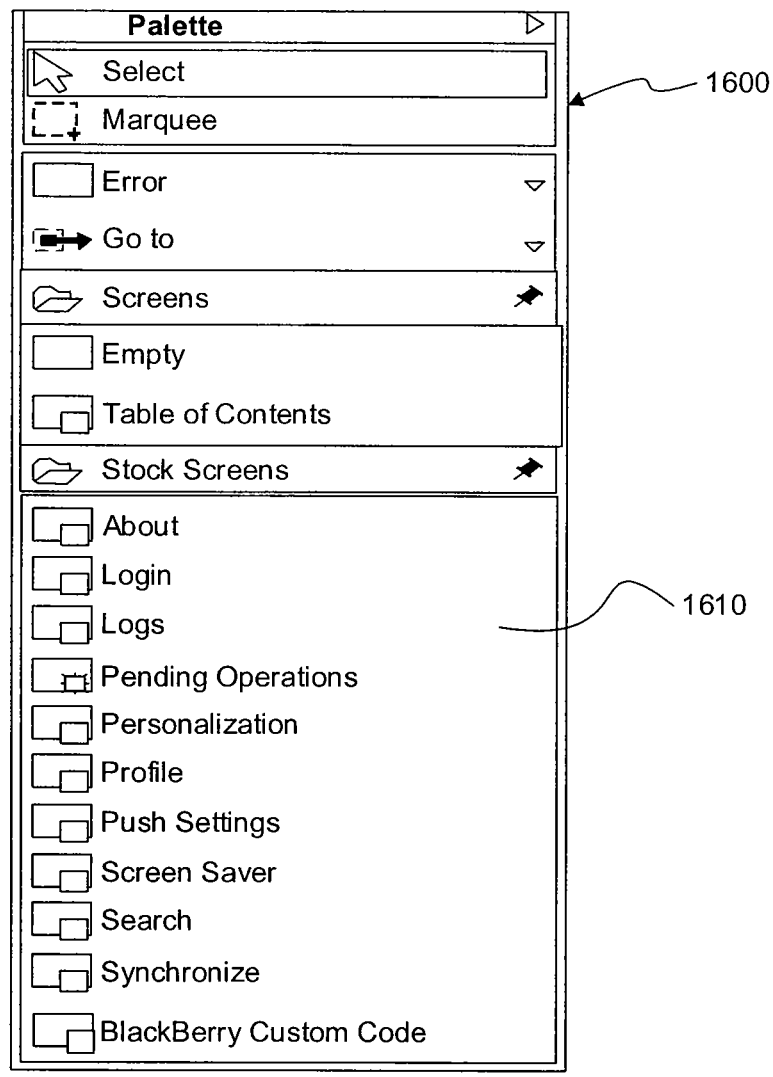

FIG. 16 illustrates flow design palette 1600 that can be used add pre-built 'stock' screens into the list of stock screens available to developers. In one embodiment, the device application designer 124 comes with certain stock screens, which were defined using menu 1600 for many functionally needed screens. Each platform 164 should support all existing stock screens 1610. Stock screens 1610 are grouped under the stock screen folder in the flow design palette 1600.

Figure 17:
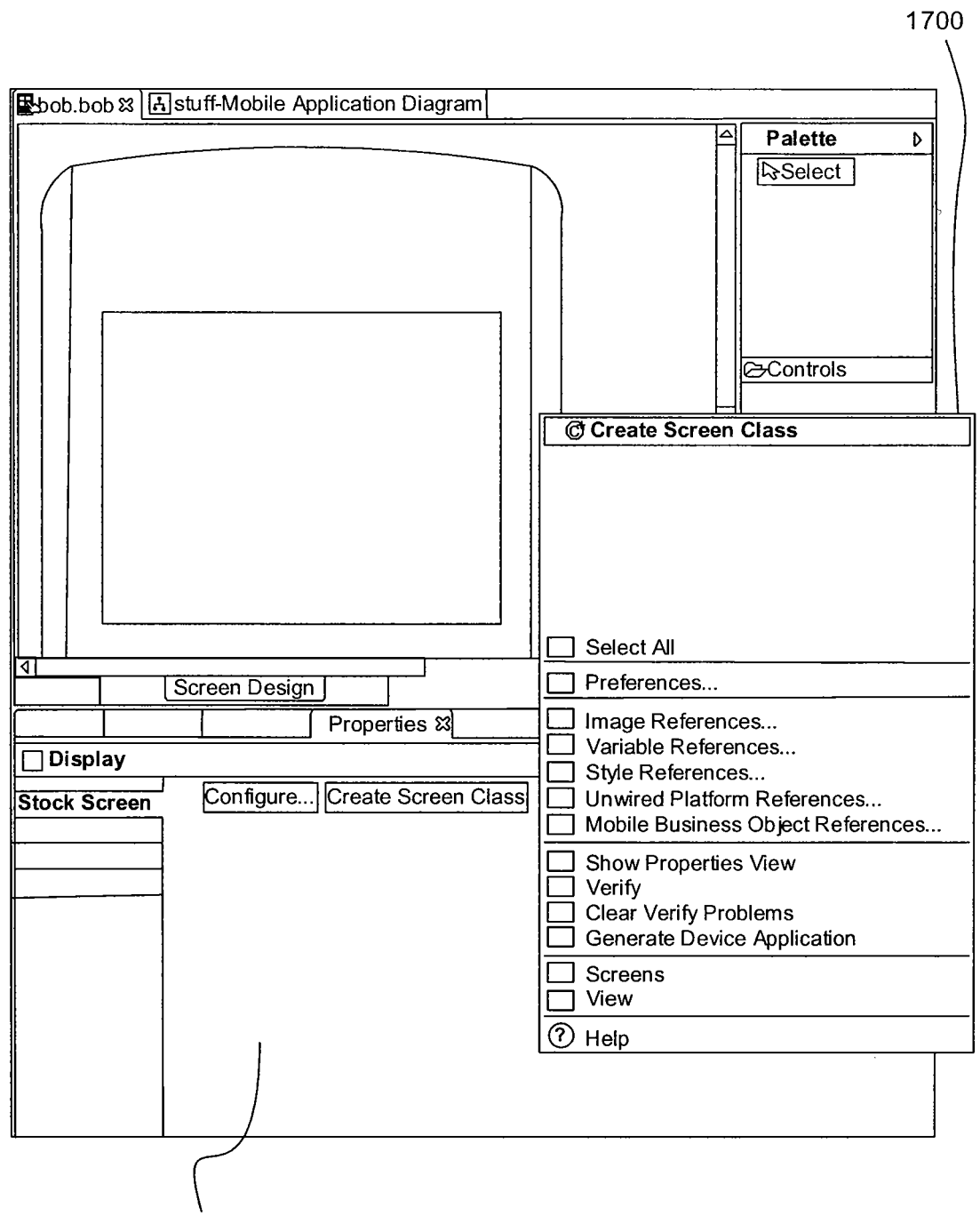

FIG. 17 depicts a create screen class interface 1700. In interface 1700, a properties page 1710 can be used to set properties for a newly-created screen within mobile device application 168.

Figure 18:
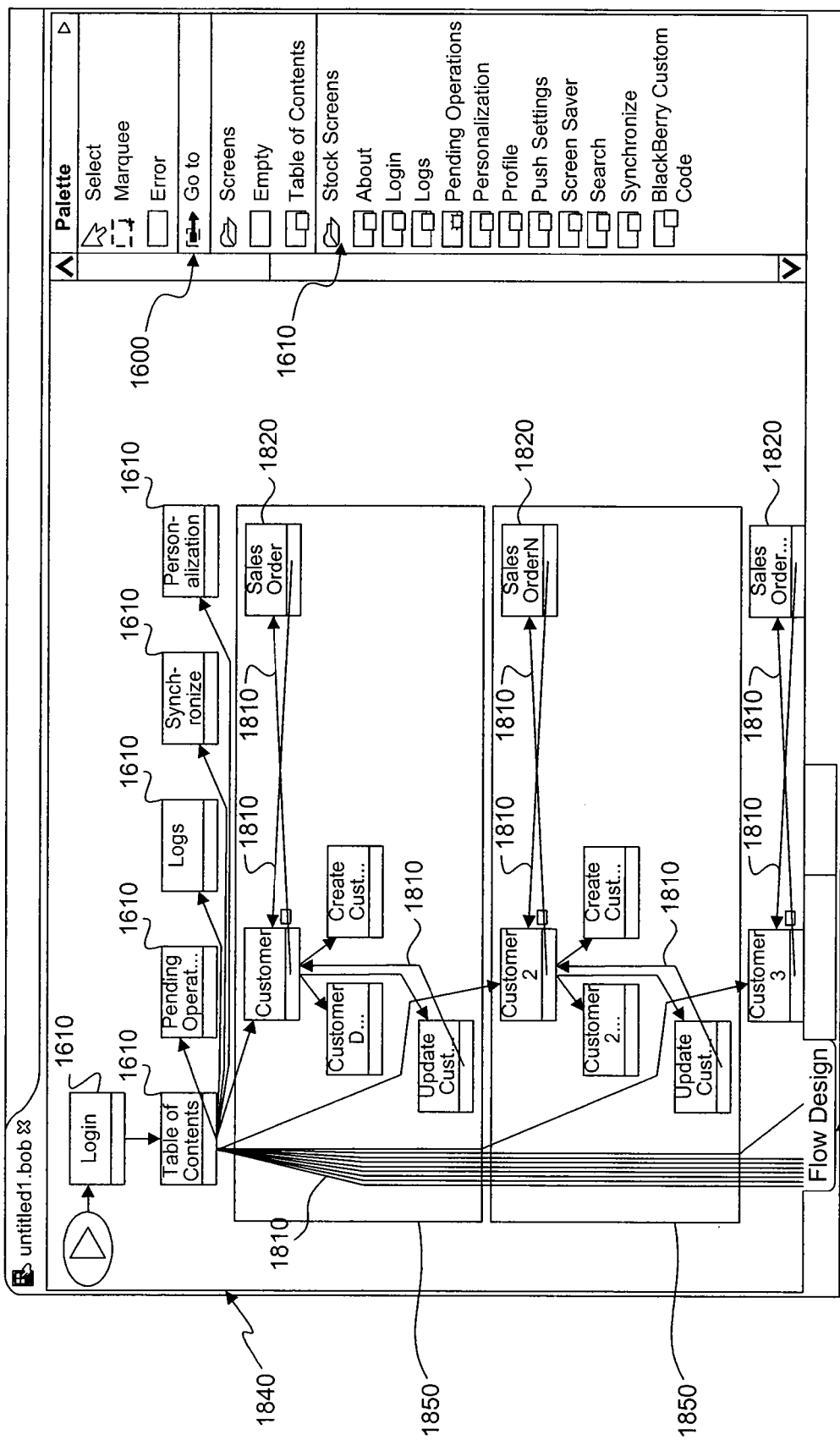
Figure 19:
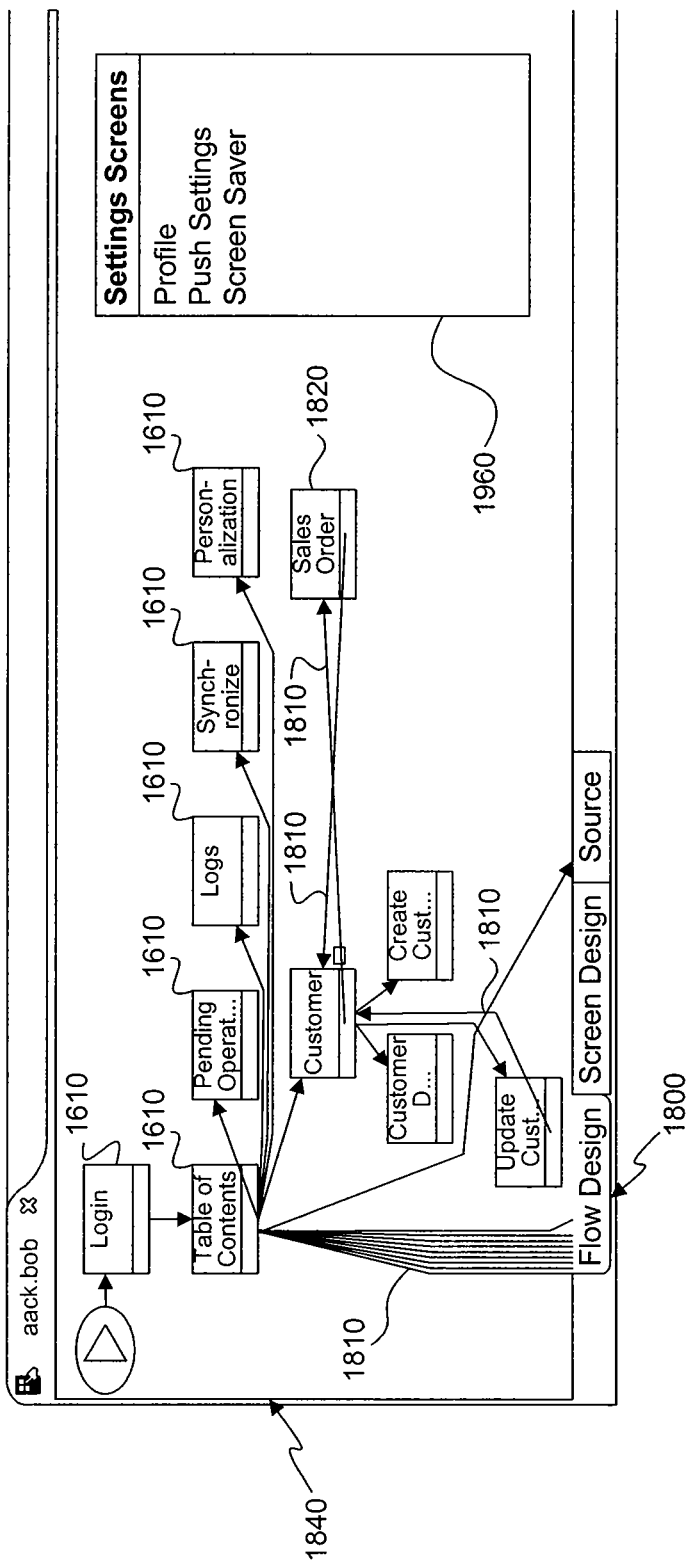

FIGS. 18 and 19 depict a flow design interface 1800. FIGS. 18 and 19 are described with continued to the embodiment illustrated in FIG. 16. As illustrated in FIG. 18, palette 1600 of screens can be used to select application screens from a set of default, stock screens 1610, and custom screens 1820. For example, pre-defined stock screens 1610 can be dragged and dropped from palette 1600 onto flow design 'canvas' 1840 within flow design interface 1800. In an embodiment, flow design interface 1800 can be used to visually design the flow for application 168. Flow design interface 1800 can be used to receive developer selections of properties for newly-created screens 1820 within mobile device application 168. Flow design interface 1800 can also be used to select connections 1810 between stock screens 1610 and custom screens 1820 by receiving, via an input device (not shown), selection of one or more connections 1810 between one or more selected screens 1820. Using flow design interface 1800, additional custom mobile screens 1820 can be added to mobile device application 168, as needed. Connections 1810 between the screens can also be selected in order to create a flow design for custom mobile application 168 screens. In this way, flow design interface 1800 can also be used to add and connect screens, as well as customized stock screens 1820.

Additional connections 1810 can be created between screens 1610 and 1820 within mobile application 168 using flow design interface 1800. In one embodiment, a selection of a connection type from a set or palette of connection types is received from flow design interface 1800. In flow design interface 1800, a developer can, using an input device (not shown), select a source screen 1820 and drag to connect it to a target screen 1820 via a connection 1810.

As shown in FIG. 18, screen sets 1850 comprising collections of custom screens 1820 can be grouped together in flow design interface 1800. In an embodiment, flow design interface 1800 allows a designer to toggle between hiding details of connections 1810 to other screens 1820 within a screen set 1850 by collapsing screen views to icons and expanding screen views to show both the screens 1820 and connections 1810 to other screens 1820 within the screen set 1850. In this way, a developer can collapse a screen set 1850 into something like a folder figure that hides the detail, or expand it to show all screens 1820 and connections 1810 within a screen set 1850. The purpose of this is to reduce clutter within flow design interface 1800, especially for applications with many screens. Connections 1810 between screens created in flow design interface 1800 will not work until they are used in an action attached to a menu, button, or another control is selected.

As shown in FIG. 19, menu 1960 can be used to profile, push, or save the new screens 1820 selected in flow design interface 1800.

Example Computer Implementation

Figure 20:
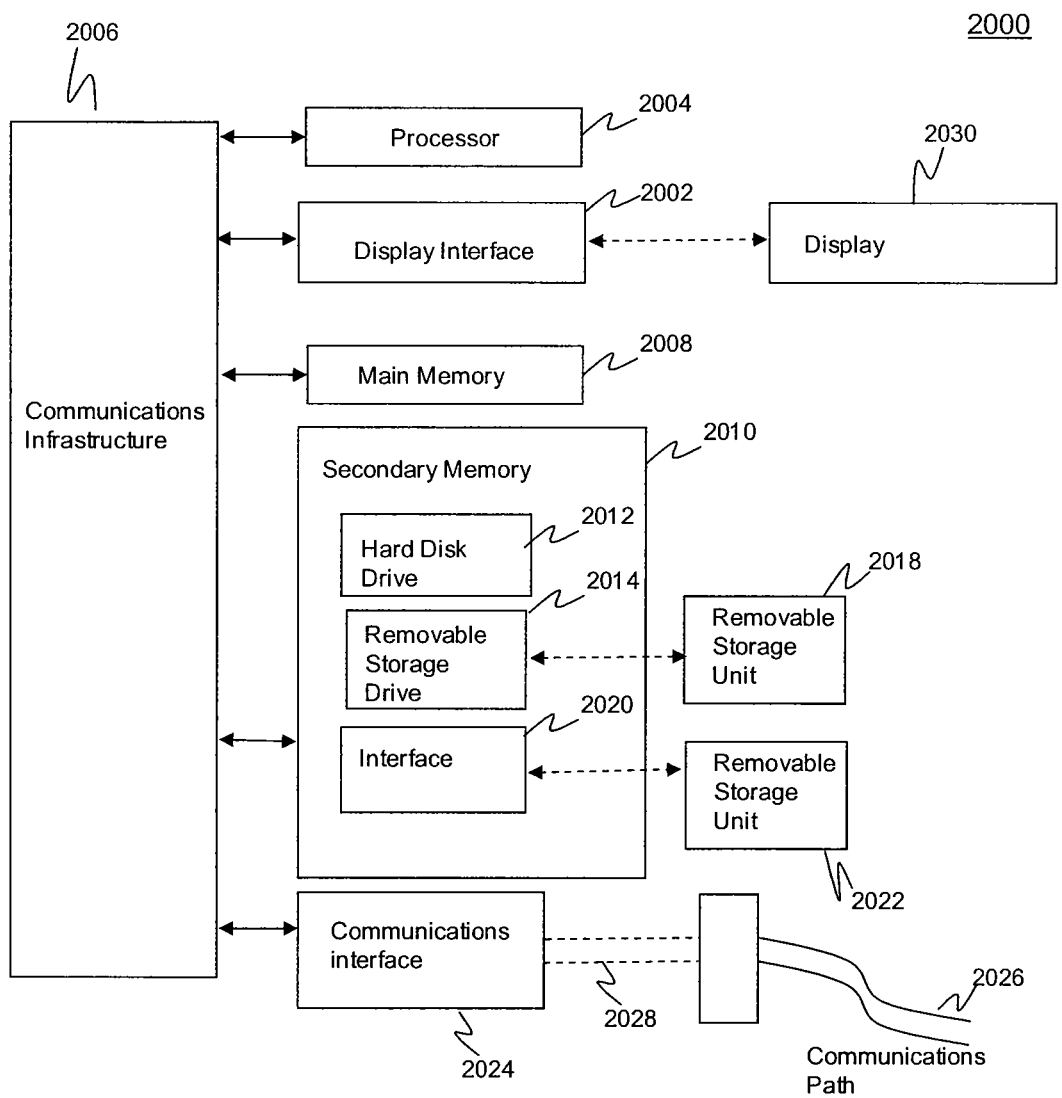
FIG. 20 depicts an example computer system in which the present invention may be implemented.

Various aspects of the present invention can be implemented by software, firmware, hardware, or a combination thereof. FIG. 20 illustrates an example computer system 2000 in which the present invention, or portions thereof, can be implemented as computer-readable code. For example, the methods illustrated by the flowchart 300 of FIG. 3 can be implemented in system 2000. The device application designer tool described above can also be implemented in system 2000. The GUI described above with reference to FIGS. 7-19 can be displayed via display interface 20002 on display 2030. Various embodiments of the invention are described in terms of this example computer system 2000. After reading this description, it will become apparent to a person skilled in the relevant art how to implement the invention using other computer systems and/or computer architectures.

Computer system 2000 includes one or more processors, such as processor 2004. Processor 2004 can be a special purpose or a general purpose processor. Processor 2004 is connected to a communication infrastructure 2006 (for example, a bus, or network).

Computer system 2000 also includes a main memory 2008, preferably random access memory (RAM), and may also include a secondary memory 2010. Secondary memory 2010 may include, for example, a hard disk drive 2012, a removable storage drive 2014, flash memory, a memory stick, and/or any similar non-volatile storage mechanism. Removable storage drive 2014 may comprise a floppy disk drive, a magnetic tape drive, an optical disk drive, a flash memory, or the like. The removable storage drive 2014 reads from and/or writes to a removable storage unit 2018 in a well known manner. Removable storage unit 2018 may comprise a floppy disk, magnetic tape, optical disk, etc. which is read by and written to by removable storage drive 2014. As will be appreciated by persons skilled in the relevant art(s), removable storage unit 2018 includes a computer usable storage medium having stored therein computer software and/or data.

In alternative implementations, secondary memory 2010 may include other similar means for allowing computer programs or other instructions to be loaded into computer system 2000. Such means may include, for example, a removable storage unit 2022 and an interface 2020. Examples of such means may include a program cartridge and cartridge interface (such as that found in video game devices), a removable memory chip (such as an EPROM, or PROM) and associated socket, and other removable storage units 2022 and interfaces 2020 which allow software and data to be transferred from the removable storage unit 2022 to computer system 2000.

Computer system 2000 may also include a communications interface 2024. Communications interface 2024 allows software and data to be transferred between computer system 2000 and external devices. Communications interface 2024 may include a modem, a network interface (such as an Ethernet card), a communications port, a PCMCIA slot and card, or the like. Software and data transferred via communications interface 2024 are in the form of signals which may be electronic, electromagnetic, optical, or other signals capable of being received by communications interface 2024. These signals are provided to communications interface 2024 via a communications path 2026. Communications path 2026 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 2018, removable storage unit 2022, and a hard disk installed in hard disk drive 2012. Signals carried over communications path 2026 can also embody the logic described herein. Computer program medium and computer usable medium can also refer to memories, such as main memory 2008 and secondary memory 2010, which can be memory semiconductors (e.g. DRAMs, etc.). These computer program products are means for providing software to computer system 2000.

Computer programs (also called computer control logic) are stored in main memory 2008 and/or secondary memory 2010. Computer programs may also be received via communications interface 2024. Such computer programs, when executed, enable computer system 2000 to implement the present invention as discussed herein. In particular, the computer programs, when executed, enable processor 2004 to implement the processes of the present invention, such as the steps in the methods illustrated by flowchart 300 of FIG. 3 discussed above. Accordingly, such computer programs represent controllers of the computer system 2000. Where the invention is implemented using software, the software may be stored in a computer program product and loaded into computer system 2000 using removable storage drive 2014, interface 2020, hard drive 2012, or communications interface 2024.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The invention can work with software, hardware, and/or operating system implementations other than those described herein. Any software, hardware, and operating system implementations suitable for performing the functions described herein can be used.

APPENDIX

The attached Appendix forms a part of this application, and is thus herein incorporated by reference in its entirety. The Appendix provides a technical specification for an exemplary device application designer entitled 'Bob.' In particular, section 1.1.5 of the Appendix describes an exemplary generation wizard and section 1.1.7 describes an embodiment of how the 'Bob' device application designer can provide a developer with a device and platform-specific view of a UI control based on a selection of a device and platform. Section 5.5 of the Appendix describes an exemplary modeling tool that can be used to provide platform and device specific validation and allow for correction of device specific features of a mobile application design.

CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for developing a mobile application, comprising:
  receiving a mobile platform selection;
  accessing a data model corresponding to the selected mobile platform, wherein the data model comprises:
    operational characteristics of the selected mobile platform;
    pre-defined application screens for the selected mobile platform;
    mobile devices supported by the selected mobile platform; and
    default input controls for each of the mobile devices supported by the selected mobile platform;
  presenting, in an interactive display, the pre-defined application screens;
  receiving, via the interactive display, a selection of one or more of the pre-defined application screens and a selection of one or more logical connections between the pre-defined application screens;
  generating source code for the mobile application based on the selection of one or more pre-defined application screens;
  validating the source code to detect errors when executed in the mobile application, wherein validating includes performing platform specific checks based on the selected mobile platform;
  in response to detecting one or more errors in the source code during the validating, launching an agent-based debugger and generating an interactive map for the source code of the mobile application, wherein the interactive map comprises a link between a graphical depiction of functional components of the mobile application and corresponding portions of source code associated with the one or more errors for which the interactive map was generated such that selecting a functional component provides the corresponding source code for debugging the one or more errors;
  receiving, via the debugger in conjunction with the interactive map, modifications to the source code corresponding to the detected one or more errors; and
  transmitting the generated source code for the mobile application to at least one of the mobile device supported by the selected platform.

2. The method of claim 1, further comprising, prior to the generating:
  receiving a selection of a mobile device;
  presenting, in the interactive display, input controls for the selected mobile device; and
  receiving, via the interactive display, a selection of one or more of the input controls to be associated with one or more of the selected pre-defined application screens.

3. The method of claim 2, wherein the validating is based on the data model, the selected mobile platform, the selected pre-defined application screens, the selected mobile device, and the selected input controls.

4. The method of claim 2, further comprising:
  modeling, using a device modeler corresponding to the selected mobile platform and mobile device, operation of the mobile application on the selected mobile device.

5. The method of claim 3, further comprising:
  modeling simulated operation of the modified mobile application.

6. The method of claim 1, wherein the interactive map comprises a link between a graphical depiction of functional components of the mobile application and corresponding help files.

7. The method of claim 6, wherein the agent-based debugger accesses the interactive map to enable graphical navigation to the source code to be modified.

8. The method of claim 1, wherein the interactive display further comprises:
  a screen selection canvas and palette for selection of one or more of the pre-defined application screens; and
  a screen design canvas for creation of custom application screens.

9. The method of claim 1, wherein the data model is an Extensible Markup Language (XML) file.

10. A computer program product comprising a non-transitory computer readable storage medium having computer program logic stored thereon for enabling a processor to perform a method to generate mobile applications, the method comprising:
  receiving a mobile platform selection;
  accessing a data model corresponding to the selected mobile platform, wherein the data model comprises:
    operational characteristics of the selected mobile platform;
    pre-defined application screens for the selected mobile platform;
    mobile devices supported by the selected mobile platform; and
    default input controls for each of the mobile devices supported by the selected mobile platform;
  presenting, in an interactive display, the pre-defined application screens;
  receiving, via the interactive display, a selection of one or more of the pre-defined application screens and a selection of one or more logical connections between the pre-defined application screens;
  generating source code for the mobile application based on the selection of one or more predefined application screens;
  validating the source code to detect errors when executed in the mobile application, wherein validating includes performing platform specific checks based on the selected mobile platform;
  in response to detecting one or more errors in the source code during the validating, launching an agent-based debugger and generating an interactive map for the source code of the mobile application, wherein the interactive map comprises a link between a graphical depiction of functional components of the mobile application and corresponding portions of source code associated with the one or more errors for which the interactive map was generated such that selecting a functional component provides the corresponding source code for debugging the one or more errors; and
  receiving, via the debugger in conjunction with the interactive map, modifications to the source code corresponding to the detected one or more errors.

11. The computer program product of claim 10, the method further comprising:
  receiving a selection of a mobile device;
  presenting in the interactive display, input controls for the selected mobile device; and receiving, via the interactive display, a selection of one or more of the input controls to be associated with one or more of the selected pre-defined application screens.

12. The computer program product of claim 10, wherein the validating is based on the data model, the selected mobile platform, the selected pre-defined application screens, the selected mobile device, and the selected input controls.

13. A system for developing mobile applications, comprising:
- a memory; and
- a processing device coupled to the memory to:
  - receive a mobile platform selection and access a data model corresponding to the selected platform, wherein the data model comprises:
    - operational characteristics of the selected mobile platform;
    - pre-defined application screens for the selected mobile platform;
    - mobile devices supported by the selected mobile platform; and
    - default input controls for each of the mobile devices supported by the selected mobile platform;
  - present, in an interactive display, the pre-defined application screens, and receive, via the interactive display, a selection of one or more of the pre-defined application screens and a selection of one or more logical connections between the pre-defined application screens;
  - generate source code for the mobile application based on the selection of one or more pre-defined application screens and to validate the source code to detect errors when executed in the mobile application, wherein validating includes performing platform specific checks based on the selected mobile platform;
  - in response to detecting one or more errors in the source code during the validating, launching an agent-based debugger and generating an interactive map for the source code of the mobile application, wherein the interactive map comprises a link between a graphical depiction of functional components of the mobile application and corresponding portions of source code associated with the one or more errors for which the interactive map was generated such that selecting a functional component provides the corresponding source code for debugging the one or more errors; and
  - receive, via the debugger in conjunction with the interactive map, modifications to the source code corresponding to the detected one or more errors.

14. The system of claim 13, wherein the processing device is further configured to:
receive a selection of a mobile device, present in the interactive display, input controls for the selected mobile device, and receive, via the interactive display, a selection of one or more of the input controls to be associated with one or more of the selected pre-defined application screens.

15. The method of claim 1, further comprising:
in response to receiving a selection of one of the graphical depictions of the functional components, navigating to and displaying the corresponding source code associated with the selected graphical depiction.

16. The method of claim 15, wherein the source code includes custom application code provided by a user and not generated during the generating step.

* * * * *